US010644966B2

(12) United States Patent
Jain et al.

(10) Patent No.: US 10,644,966 B2
(45) Date of Patent: *May 5, 2020

(54) RESOURCE MANAGEMENT FOR CLOUD COMPUTING PLATFORMS

(71) Applicant: Microsoft Technology Licensing, LLC, Redmond, WA (US)

(72) Inventors: Navendu Jain, Bellevue, WA (US); Ishai Menache, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

This patent is subject to a terminal disclaimer.

(21) Appl. No.: 15/228,327

(22) Filed: Aug. 4, 2016

(65) Prior Publication Data
US 2016/0344595 A1    Nov. 24, 2016

Related U.S. Application Data

(63) Continuation of application No. 13/169,923, filed on Jun. 27, 2011, now Pat. No. 9,450,838.

(51) Int. Cl.
*H04L 12/24* (2006.01)
*G06F 9/50* (2006.01)
(Continued)

(52) U.S. Cl.
CPC ........ *H04L 41/5025* (2013.01); *G06F 9/5072* (2013.01); *H04L 47/803* (2013.01); *H04L 67/1008* (2013.01); *G06F 2209/508* (2013.01)

(58) Field of Classification Search
CPC ................... H04L 41/5006; H04L 41/5025
See application file for complete search history.

(56) References Cited

U.S. PATENT DOCUMENTS 5,576,700 A    11/1996   Davis et al.
6,263,315 B1    7/2001   Talluri
(Continued)

FOREIGN PATENT DOCUMENTS

CN    100458605 C    2/2009
CN    101430596 A    5/2009
(Continued)

OTHER PUBLICATIONS

Beloglazov, "Energy Efficient Resource Management in Virtualized Cloud Data Centers", Proceedings of the 10th IEEE/ACM International Conference on Cluster, Cloud and Grid Computing, May 17-20, 2010, 6 pages.
(Continued)

*Primary Examiner* — Jason D Recek
(74) *Attorney, Agent, or Firm* — Rainier Patents, P.S.

(57) ABSTRACT

A system for managing allocation of resources based on service level agreements between application owners and cloud operators. Under some service level agreements, the cloud operator may have responsibility for managing allocation of resources to the software application and may manage the allocation such that the software application executes within an agreed performance level. Operating a cloud computing platform according to such a service level agreement may alleviate for the application owners the complexities of managing allocation of resources and may provide greater flexibility to cloud operators in managing their cloud computing platforms.

20 Claims, 9 Drawing Sheets

(51) Int. Cl.
   *H04L 12/927*   (2013.01)
   *H04L 29/08*   (2006.01)

(56) References Cited

U.S. PATENT DOCUMENTS

| | | |
|---|---|---|
| 6,452,289 B1 | 9/2002 | Lansberry |
| 6,795,928 B2 | 9/2004 | Bradley et al. |
| 6,868,682 B2 | 3/2005 | Sharma et al. |
| 7,110,913 B2 | 9/2006 | Monroe et al. |
| 7,111,061 B2 | 9/2006 | Leighton et al. |
| 7,127,625 B2 | 10/2006 | Farkas |
| 7,135,956 B2 | 11/2006 | Bartone et al. |
| 7,136,830 B1 | 11/2006 | Kuelbs et al. |
| 7,272,735 B2 | 9/2007 | Fung |
| 7,318,154 B2 | 1/2008 | Tehee, Jr. |
| 7,321,221 B2 | 1/2008 | Bucker et al. |
| 7,350,186 B2 | 3/2008 | Coleman et al. |
| 7,365,973 B2 | 4/2008 | Rasmussen et al. |
| 7,373,268 B1 | 5/2008 | Viredaz et al. |
| 7,379,884 B2 | 5/2008 | Barsness |
| 7,437,730 B2 | 10/2008 | Goyal |
| 7,484,111 B2 | 1/2009 | Fung |
| 7,500,001 B2 | 3/2009 | Tameshige et al. |
| 7,525,207 B2 | 4/2009 | Clidaras |
| 7,551,130 B2 | 6/2009 | Altenschulte |
| 7,552,350 B2 | 6/2009 | Fung |
| 7,560,823 B2 | 7/2009 | Schellings |
| 7,568,360 B1 | 10/2009 | Germagian et al. |
| 7,604,535 B2 | 10/2009 | Germagian et al. |
| 7,606,719 B2 | 10/2009 | Barsness |
| 7,608,937 B1 | 10/2009 | Altenschulte |
| 7,711,587 B2 | 5/2010 | de Marcken |
| 7,752,858 B2 | 7/2010 | Johnson et al. |
| 7,797,563 B1 | 9/2010 | Moll |
| 7,820,321 B2 | 10/2010 | Horne |
| 7,881,057 B2 | 2/2011 | Fink |
| 7,903,407 B2 | 3/2011 | Matsushima et al. |
| 7,923,965 B2 | 4/2011 | Ritter |
| 7,961,463 B2 | 6/2011 | Belady et al. |
| 8,041,967 B2 | 10/2011 | Belady et al. |
| 8,080,898 B2 | 12/2011 | Fukuhara |
| 8,080,900 B2 | 12/2011 | Corhodzic |
| 8,082,454 B2 | 12/2011 | Totten |
| 8,145,731 B2 | 3/2012 | Cherkasova et al. |
| 8,164,897 B2 | 4/2012 | Graybill |
| 8,189,561 B2 | 5/2012 | Karaoguz et al. |
| 8,225,119 B2 | 7/2012 | Jain |
| 8,458,011 B2 | 6/2013 | Al-Dawsari et al. |
| 8,839,254 B2 | 9/2014 | Horvitz et al. |
| 8,849,469 B2 | 9/2014 | Belady et al. |
| 9,063,738 B2 | 6/2015 | Jain et al. |
| 9,207,993 B2 | 12/2015 | Jain |
| 9,450,838 B2 | 9/2016 | Jain et al. |
| 9,595,054 B2 | 3/2017 | Jain et al. |
| 2002/0004913 A1 | 1/2002 | Fung |
| 2002/0124103 A1* | 9/2002 | Maruyama ............... H04L 47/10 709/234 |
| 2002/0152305 A1 | 10/2002 | Jackson et al. |
| 2003/0079151 A1 | 4/2003 | Bohrer |
| 2003/0101263 A1 | 5/2003 | Bouillet et al. |
| 2003/0115495 A1 | 6/2003 | Rawson |
| 2003/0193777 A1 | 10/2003 | Friedrich et al. |
| 2003/0196126 A1 | 10/2003 | Fung |
| 2004/0177057 A1 | 9/2004 | Fairchild et al. |
| 2004/0236846 A1 | 11/2004 | Alvarez et al. |
| 2005/0021530 A1* | 1/2005 | Garg ....................... G06F 9/505 |
| 2005/0132051 A1 | 6/2005 | Hill |
| 2005/0165925 A1* | 7/2005 | Dan ....................... G06F 9/5083 709/224 |
| 2005/0190912 A1 | 9/2005 | Hopkins et al. |
| 2005/0193113 A1 | 9/2005 | Kokusho |
| 2005/0198231 A1* | 9/2005 | Gasca, Jr. ............ G06F 9/5061 709/221 |
| 2005/0241810 A1 | 11/2005 | Malone et al. |
| 2005/0256952 A1 | 11/2005 | Mouhanna et al. |
| 2006/0036878 A1 | 2/2006 | Rothman |
| 2006/0041537 A1 | 2/2006 | Ahmed |
| 2006/0080213 A1 | 4/2006 | Inoue |
| 2006/0171315 A1* | 8/2006 | Choi ................... H04L 41/5003 370/230 |
| 2006/0184287 A1 | 8/2006 | Belady et al. |
| 2006/0277109 A1 | 12/2006 | Kerth et al. |
| 2007/0049133 A1 | 3/2007 | Conroy |
| 2007/0097636 A1 | 5/2007 | Johnson et al. |
| 2007/0130341 A1 | 6/2007 | Ma |
| 2007/0136392 A1 | 6/2007 | Oh et al. |
| 2007/0162260 A1* | 7/2007 | Nordstrom ............... G06F 9/505 702/186 |
| 2007/0250838 A1 | 10/2007 | Belady et al. |
| 2007/0294408 A1 | 12/2007 | Jackson |
| 2008/0030078 A1 | 2/2008 | Whitted |
| 2008/0049714 A1 | 2/2008 | Commarford et al. |
| 2008/0072090 A1 | 3/2008 | O'Connor |
| 2008/0141048 A1 | 6/2008 | Palmer |
| 2008/0201720 A1 | 8/2008 | Betzler |
| 2008/0234873 A1 | 9/2008 | Gorbatov et al. |
| 2008/0255899 A1 | 10/2008 | McConnell et al. |
| 2008/0313101 A1 | 12/2008 | Helander et al. |
| 2008/0316938 A1 | 12/2008 | Shi |
| 2009/0063122 A1 | 3/2009 | Nasle |
| 2009/0106571 A1 | 4/2009 | Low et al. |
| 2009/0119233 A1 | 5/2009 | Dunagan et al. |
| 2009/0215375 A1 | 8/2009 | Hagensen |
| 2009/0228726 A1 | 9/2009 | Malik et al. |
| 2009/0229194 A1 | 9/2009 | Armillas |
| 2009/0248854 A1 | 10/2009 | Conway |
| 2009/0251860 A1 | 10/2009 | Belady et al. |
| 2009/0254660 A1 | 10/2009 | Hanson |
| 2009/0265568 A1 | 10/2009 | Jackson |
| 2009/0265704 A1 | 10/2009 | Branda et al. |
| 2009/0271046 A1 | 10/2009 | Lewis |
| 2009/0276771 A1 | 11/2009 | Nickolov et al. |
| 2009/0279444 A1 | 11/2009 | Ravindran et al. |
| 2009/0281846 A1 | 11/2009 | Rose |
| 2009/0295167 A1 | 12/2009 | Clidaras et al. |
| 2009/0319090 A1 | 12/2009 | Dillon et al. |
| 2010/0003545 A1 | 1/2010 | Horne et al. |
| 2010/0020806 A1 | 1/2010 | Vahdat et al. |
| 2010/0037038 A1 | 2/2010 | Bieswanger |
| 2010/0049616 A1 | 2/2010 | Hipsher |
| 2010/0050172 A1 | 2/2010 | Ferris |
| 2010/0057641 A1 | 3/2010 | Boss |
| 2010/0058350 A1 | 3/2010 | Boss |
| 2010/0061250 A1 | 3/2010 | Nugent |
| 2010/0088150 A1 | 4/2010 | Mazhar et al. |
| 2010/0088205 A1 | 4/2010 | Robertson |
| 2010/0100696 A1 | 4/2010 | Suzuki |
| 2010/0145801 A1 | 6/2010 | Chekuri |
| 2010/0191998 A1 | 7/2010 | Moore |
| 2010/0211669 A1 | 8/2010 | Dalgas et al. |
| 2010/0218005 A1 | 8/2010 | Jain |
| 2010/0218186 A1 | 8/2010 | Wolfe et al. |
| 2010/0228819 A1 | 9/2010 | Wei |
| 2010/0235903 A1 | 9/2010 | Carter et al. |
| 2010/0248609 A1 | 9/2010 | Tresh et al. |
| 2010/0250358 A1 | 9/2010 | Elkins, II et al. |
| 2010/0306776 A1 | 12/2010 | Greene |
| 2010/0318454 A1 | 12/2010 | Warncke et al. |
| 2010/0319004 A1 | 12/2010 | Hudson |
| 2010/0332401 A1 | 12/2010 | Prahlad et al. |
| 2010/0333105 A1 | 12/2010 | Horvitz et al. |
| 2010/0333116 A1 | 12/2010 | Prahlad et al. |
| 2011/0016214 A1 | 1/2011 | Jackson |
| 2011/0035072 A1 | 2/2011 | Jackson |
| 2011/0055034 A1 | 3/2011 | Ferris et al. |
| 2011/0099095 A1 | 4/2011 | Moore et al. |
| 2011/0105015 A1 | 5/2011 | Carlson |
| 2011/0131309 A1 | 6/2011 | Akiyama |
| 2011/0138708 A1 | 6/2011 | Chazelle et al. |
| 2011/0161526 A1 | 6/2011 | Ravindran et al. |
| 2011/0205949 A1 | 8/2011 | Maenpaa et al. |
| 2011/0208606 A1 | 8/2011 | Hadar et al. |
| 2011/0231552 A1 | 9/2011 | Carter |
| 2011/0240265 A1 | 10/2011 | Dechene |

(56) References Cited

U.S. PATENT DOCUMENTS

| | | |
|---|---|---|
| 2011/0278928 A1 | 11/2011 | Burger et al. |
| 2011/0282982 A1 | 11/2011 | Jain |
| 2011/0288898 A1 | 11/2011 | Roe |
| 2011/0296019 A1 | 12/2011 | Ferris et al. |
| 2012/0016721 A1 | 1/2012 | Weinman |
| 2012/0030356 A1 | 2/2012 | Fletcher |
| 2012/0089726 A1 | 4/2012 | Doddavula |
| 2012/0095940 A1 | 4/2012 | Borgs et al. |
| 2012/0102224 A1* | 4/2012 | Mercuri ................ G06F 9/5055 709/241 |
| 2012/0109705 A1 | 5/2012 | Belady et al. |
| 2012/0115433 A1 | 5/2012 | Young et al. |
| 2012/0130554 A1 | 5/2012 | Jain et al. |
| 2012/0158447 A1 | 6/2012 | Jain |
| 2012/0254437 A1* | 10/2012 | Hirschfeld ............ G06F 9/5044 709/226 |
| 2012/0259760 A1 | 10/2012 | Sgouridis et al. |
| 2012/0290725 A1 | 11/2012 | Podila |
| 2012/0330711 A1 | 12/2012 | Jain et al. |
| 2012/0331113 A1 | 12/2012 | Jain et al. |
| 2014/0365402 A1 | 12/2014 | Belady et al. |

FOREIGN PATENT DOCUMENTS

| | | |
|---|---|---|
| CN | 101916415 A | 12/2010 |
| CN | 101096942 A | 3/2013 |
| JP | 2003-162591 | 6/2003 |
| JP | 20030324956 | 11/2003 |
| JP | 2006-508445 A | 3/2006 |
| JP | 2007-249470 | 9/2007 |
| JP | 2007-324956 | 12/2007 |
| KR | 1020050084874 A | 8/2005 |
| KR | 1020090120704 B1 | 11/2009 |
| WO | 2004049157 A2 | 6/2004 |
| WO | 2004/092971 A1 | 10/2004 |
| WO | 2009012451 A2 | 1/2009 |
| WO | 2010010544 A2 | 1/2010 |

OTHER PUBLICATIONS

Clark, "Live Migration on Virtual Machines", In Proceedings of the 2nd ACM/USENIX Symposium on Networked Systems Design and Implementation, May 2005, 14 pages.

"Solar Chimney", Wikipedia, Published on or Before Feb. 27, 2005, 5 pages.

"Solar Updraft Tower", Wikipedia, Published on or Before Aug. 30, 2006, 6 pages.

Le, "Managing the Cost, Energy Consumption, and Carbon Footprint of Internet Services", In Proceedings of the ACM SIGMETRICS Conference, Jun. 14-18, 2010, 2 pages.

Gmach, "Capacity Planning and Power Management to Exploit Sustainable Energy", In Proceedings of the International Conference on Network and Service Management, Oct. 25-29, 2010, 8 pages.

Giannakoudis, "Optimum Design and Operation Under Uncertainty of Power Systems Using Renewable Energy Sources and Hydrogen Storage", In International Journal of Hydrogen Energy, Feb. 2010, 20 pages.

Kant, "Distributed Energy Adaptive Computing", In Proceedings of the IEEE International Conference on Communications, May 2010, 6 pages.

Chaver, "Energy-Aware Fetch Mechanism: Trace Cache and BTB Customization", In Proceedings of the International Symposium on Low Power Electronics and Design, Aug. 8-10, 2005, 6 pages.

Kant, "Power Control of High Speed Network Interconnects in Data Centers", In Proceedings of the IEEE INFOCOM Workshops, Apr. 19-25, 2009, 6 pages.

Verma, "BrownMap: Enforcing Power Budget in Shared Data Centers", Dec. 17, 2009, 15 pages.

Kant, "Data Center Evolution: A Tutorial on State of the Art, Issues, and Challenges", Computer Networks, Dec. 3, 2009, 27 pages.

Bianchini, "Power and Energy Management for Server Systems", Computer, Nov. 2004, 37(11), pp. 68-76, 11 pages.

Extended European Search Report dated Nov. 14, 2012 from European Patent Application No. 10744134.7, 6 pages.

Felter et al., "A Performance-Conserving Approach for Reducing Peak Power Consumption in Server Systems", Proceedings of the 19th Annual International Conference on Supercomputing, Jun. 20-22, 2005, pp. 293-302, 10 pages.

Iranli et al., "System-Level Power Management: An Overview", The VLSI Handbook, Dec. 2006, 22 pages.

International Search Report and Written Opinion dated Sep. 30, 2010 for PCT Patent Application No. PCT/US2010/023253, 7 pages.

Urgaonkar et al., "Dynamic Provisioning of Multi-tier Internet Applications", Proceedings of the 2nd International Conference on Autonomic Computing, Jun. 13-16, 2005, 12 pages.

USENIX, "5th USENIX Symposium on Networked Systems Design and Implementation", Technical Sessions, Apr. 16-18, 2008, 4 pages.

Wang et al., "Feedback Control Algorithms for Power Management of Servers", Hewlett-Packard Laboratories, Jun. 6, 2008, 6 pages.

Jain et al., "SLA-Integrated Pricing Models for Cloud Computing", Microsoft Research, Oct. 18, 2010, 5 pages.

Ardagna et al., "SLA Based Profit Optimization in Multi-tier Systems", Proceedings of the 4th IEEE International Symposium on Network Computing and Applications, Jul. 27-29, 2005, pp. 263-266, 4 pages.

Jain, Navendu, "An Optimization Framework for Dynamic Client-Server Partitioning in the IMA Application", Apr. 16, 2010, 3 pages.

Karve et al., "Dynamic Placement for Clustered Web Applications", International World Wide Web Conference Committee, May 22-26, 2006, pp. 595-604, 10 pages.

Liu et al., "GreenCloud: A New Architecture for Green Data Center", Proceedings of the 6th International Conference Industry Session on Autonomic Computing and Communications Industry, Jun. 16, 2009, pp. 29-38, 10 pages.

Borgs et al., "Optimal Mechanisms for Perishable Goods With Variable Supply and Demand", Aug. 11, 2010, 8 pages.

International Search Report and Written Opinion dated Jan. 31, 2013 from PCT Patent Application No. PCT/US2012/042110, 7 pages.

Bansal et al., "Metrical Task Systems and the k-Server Problem on HSTs", Proceedings of the 37th International Colloquium on Automata, Languages and Programming, 2010, 12 pages.

Kahn, C., "As Power Demand Soars, Grid Holds Up . . . So Far", Jul. 7, 2010, Associated Press, 1 page.

Rao et al., "Minimizing Electricity Cost: Optimization of Distributed Internet Data Centers in a Multi-Electricity-Market Environment", INFOCOM, 2010, 9 pages.

Vazirani, V., "Approximation Algorithms", Springer, 2001, 396 pages.

"Carbon Dioxide Emissions from the Generation of Electric Power in the United States", retrieved at <<http://www.eia.gov/cneaf/electricity/page/co2_report/co2report.html>>, Jul. 2000, 21 pages.

Notice on the First Office Action dated Jul. 29, 2013 from Chinese Patent Application No. 201080009556.7, 11 pages.

Notice of Rejection dated Jul. 2, 2013 from Japanese Patent Application No. 2011-551110, 9 pages.

Non-Final Office Action dated Dec. 3, 2013 from U.S. Appl. No. 12/781,445, 16 pages.

Response filed Apr. 1, 2014 to the Non-Final Office Action dated Dec. 3, 2013 from U.S. Appl. No. 12/781,445, 12 pages.

Final Office Action dated May 5, 2014 from U.S. Appl. No. 12/781,445, 12 pages.

Response filed Sep. 15, 2014 to the Final Office Action dated May 5, 2014 from U.S. Appl. No. 12/781,445, 10 pages.

Notice of Allowance dated Mar. 31, 2014 from U.S. Appl. No. 12/492,385, 5 pages.

Supplemental Amendment filed Jun. 6, 2014 from U.S. Appl. No. 12/492,385, 8 pages.

Notice of Allowance dated Jun. 24, 2014 from U.S. Appl. No. 12/492,385, 8 pages.

(56) References Cited

OTHER PUBLICATIONS

Notice of Allowance dated Jul. 30, 2014 from U.S. Appl. No. 12/492,385, 7 pages.
Final Office Action dated Feb. 5, 2014 from U.S. Appl. No. 12/903,227, 18 pages.
Response filed Feb. 10, 2014 to the Final Office Action dated Oct. 9, 2013 from U.S. Appl. No. 13/169,890, 17 pages.
Non-Final Office Action dated Mar. 27, 2014 from U.S. Appl. No. 13/169,890, 13 pages.
Response filed Jul. 24, 2014 to the Non-Final Office Action dated Mar. 27, 2014 from U.S. Appl. No. 13/169,890, 18 pages.
Non-Final Office Action dated Nov. 14, 2014 from U.S. Appl. No. 13/169,890, 13 pages.
Final Office Action dated Jun. 5, 2015 from U.S. Appl. No. 13/169,890, 16 pages.
Notice of Allowance dated Apr. 13, 2015 from China Patent Application No. 201080009556.7, 7 pages.
Notice of Allowance dated Apr. 9, 2014 from U.S. Appl. No. 12/951,977, 12 pages.
Notice of Allowance dated May 21, 2014 from U.S. Appl. No. 12/951,977, 9 pages.
Notice of Allowance dated Sep. 5, 2014 from U.S. Appl. No. 12/951,977, 7 pages.
Notice of Allowance dated Apr. 15, 2015 from U.S. Appl. No. 12/951,977, 8 pages.
Office Action dated Aug. 10, 2015 from European Patent Application No. 10744134.7-1954, 6 pages.
Notice of Allowance dated Aug. 15, 2014 from U.S. Appl. No. 12/913,763, 6 pages.
Response filed Apr. 6, 2015 to the Non-Final Office Action dated Dec. 5, 2014 from U.S. Appl. No. 12/779,059, 13 pages.
Notice of Allowance dated May 20, 2015 from U.S. Appl. No. 12/779,059, 9 pages.
Amendment filed Jan. 30, 2013 from China Patent Application No. 2011-551110, 7 pages.
Argument/Amendment filed Oct. 2, 2013 from China Patent Application No. 2011-551110, 11 pages.
Request for Examination and Voluntary Amendment filed Dec. 30, 2014 from Korea Patent Application No. 10-2011-7019493, 17 pages.
"ASG-Workload Optimization Suite for Comprehensive Workload Analysis and Forecasting", Allen Systems Group, Inc., 2009, 1 page.
"Leading the Evolution of the Data Center," Brocade Communications Systems, Inc., San Jose, CA, 2008, 8 pages.
"Managing Energy Efficiency in the Data Center," EMC Corporation, Hopkinton, MA, 2008, 6 pages.
"PlateSpin Recon", retrieved on May 11, 2009 at <<http://www.novell.com/products/recon/ consolidation_ratios.html>>, Novell, Inc., 2009, 3 pages.
"The Path to a Green Data Center," Hitachi Data Systems and Brocade, Joint Solution Brief, Brocade Communications Systems, Inc., San Jose, CA, 2007, 8 pages.
"About Vibes Interactive", Vibes Interactive LLC, retrieved at <<http://www.vibesinteractive. com/about_us.html>>, 2010, 2 pages.
"Consultants: How and Why Pay Per Performance Works (Part 2—Continuation from Last Post)", Weblog posting published Apr. 4, 2010, retrieved at <<http://bizrelationships.wordpress.com/2010/04/19/consultants-how-and-why-pay-per- performance-works-part-2-continuation-from-last-post>>, 5 pages.
"Sensible Cloud: What is an SLA?", retrieved at <<http://www.sensiblecloud.com/2010/11/what-is-sla/>>, on Mar. 24, 2011, 8 pages.
"Tout+Interactive", Latest Publication Mar. 22, 2011, Earlier webblog entries published on Mar. 19, 2011, Mar. 18, 2011, Mar. 7, 2011, Mar. 6, 2011, and Nov. 29, 2010, retrieved at <<http://toutinteractive.com/>>, 8 pages.
"Zeus Launches Data Center Load Balancing Solution", retrieved at <<http://www. continuitycentral.com/news03343.htm>>, Continuity Central, Jun. 28, 2007, 1 page.
Battles et al., "Reducing Data Center Power Consumption through Efficient Storage," Network Appliance, Inc., Sunnyvale, CA, WP-7010-0207, Feb. 2007, 9 pages.
Bonvin et al., "Autonomic SLA-driven Provisioning for Cloud Applications", 11th IEEE/ACM International Symposium on Cluster, Cloud and Grid Computing (CCGrid), May 23-26, 2011, Published online Feb. 2011, 10 pages.
Borenstein et al., "Dynamic Pricing, Advanced Metering, and Demand Response in Electricity Markets", University of California Energy Institute, 2002, 102 pages.
Buchbinder et al., "Online Job-Migration for Reducing the Electricity Bill in the Cloud", Lecture Notes in Computer Science, Networking 2011 Proceedings of the 10th International IFIP TC 6 Conference on Networking, vol. 6640, Part I, 2011, pp. 172-185, 12 pages.
Buyya et al., "Cloudbus Toolkit for Market-Oriented Cloud Computing", Proceedings of the 1st International Conference on Cloud Computing, Oct. 11, 2009, pp. 24-44, 21 pages.
Chase et al., "Managing Energy and Server Resources in Hosting Centers", retrieved at <<http://cseweb.ucsd.edu/~vahdat/papers/muse-sosp01.pdf>>, 2001, 14 pages.
Chen et al., "Energy-Aware Server Provisioning and Load Dispatching for Connection-Intensive Internet Services", retrieved at <<http://research.microsoft.com/en-us/um/people/zhao/pubs/nsdi08_xiao.pdf>>, 2008, 14 pages.
Dimosthenis et al., "A Real-time Service Oriented Infrastructure," GSTF Journal on Computing, Feb. 2011, pp. 196-204, 9 pages.
Dunn, D., "Data Center Energy Efficiency Through BCM", Industry Perspectives, Jan. 2010, 7 pages.
Fan et al., "Power Provisioning for a Warehouse-sized Computer", Proceedings of the ACM International Symposium on Computer Architecture, Jun. 2007, 11 pages.
Grossman, R.L., "The Case for Cloud Computing", IT Professional, vol. 11, No. 2, Mar. 21, 2009, pp. 23-27, 5 pages.
Harrison, A., "Symantec Energy Efficient Data Center Solutions," Symantec Corporation, Cupertino, CA, Jan. 12, 2008, 15 pages.
Jiang et al., "Enabling Autonomic Power-Aware Management of Instrumented Data Centers", retrieved at <<http://ieeexplore.ieee.org/stamp/stamp.jsp?arnumber=05160976>>, 2009, 8 pages.
Li et al., "Load Balancing for Multi-tiered Database Systems through Autonomic Placement of Materialized Views", Proceedings of the 22nd International Conference on Data Engineering (ICDE 2006), 2006, 1 page.
Pauley, W.A., "Cloud Provider Transparency: An Empirical Evaluation", IEEE Security and Privacy, vol. 8, No. 6, Aug. 19, 2010, pp. 32-39, 8 pages.
Popa et al., "Enabling Security in Cloud Storage SLAs with CloudProof", Microsoft Research Technical Report MSR-TR-2010-46, May 2010, pp. 1-12, 12 pages.
Timmer, J., "Renewable Energy and the Future of the Datacenter", Arstechnica.com Business News, May 2008, 2 pages.
Zhang, Q., "Cloud Computing: State-of-the-Art and Research Challenges", Journal of Internet Services and Applications, vol. 1 (1), May 2010, published online Apr. 20, 2010, pp. 7-18, 12 pages.
Response to Rules 70(2) and 70a(2) EPC Communication filed Jan. 30, 2013 from European Patent Application No. 10744134.7, 15 pages.
Response to Office Action filed Dec. 9, 2013 from Chinese Patent Application No. 201080009556.7, 15 pages.
Response filed Feb. 17, 2015 to the Non-Final Office Action dated Nov. 14, 2014 from U.S. Appl. No. 13/169,890, 19 pages.
Notice of Allowance dated Dec. 24, 2014 from U.S. Appl. No. 12/951,977, 7 pages.
Final Office Action dated Jul. 31, 2014 from Chinese Patent Application No. 201080009556.7, 7 pages.
Response to Second Office Action filed Jun. 10, 2014 from Japanese Patent Application No. 2011551110, 16 pages.
Response to Second Office Action filed Apr. 30, 2014 from Chinese Patent Application No. 201080009556.7, 16 pages.
Rules 70(2) and 70a(2) EPC Communication dated Dec. 3, 2012 from European Patent Application No. 10744134.7, 1 page.

(56) References Cited

OTHER PUBLICATIONS

Bansal, N. et al., "A Primal-Dual Randomized Algorithm for Weighted Paging", retrieved at <<http://www.cs.technion.ac.il/~nivb/papers/weighted-paging.pdf>>, 2007, 11 pages.
Bansal, N. et al., "Randomized Competitive Algorithms for Generalized Caching", Proceedings of the 40th Annual ACM Symposium on Theory of Computing, May 17-20, 2008; pp. 235-244, 10 pages.
Bansal, N. et al., "Towards the Randomized k-Server Conjecture: A Primal-Dual Approach", Proceedings of the 21st Annual ACM-SIAM Symposium on Discrete Algorithms, 2010, Society for Industrial and Applied Mathematics, Philadelphia, PA, pp. 40-55, 24 pages.
Bartal, Y. et al., "A Polylog (N)-Competitive Algorithm for Metrical Task Systems", Proceedings of the 29th Annual ACM Symposium on Theory of Computing, 1997, New York, NY, pp. 711-719, 9 pages.
Belady, C., "In the Data Center, Power and Cooling Costs More Than the IT Equipment it Supports", Electronic Cooling, Feb. 1, 2007, 6 pages.
Borodin, A. et al., "An Optimal On-Line Algorithm for Metrical Task System", Journal of the ACM, vol. 39, No. 4, Sep. 1992, pp. 745-763, 19 pages.
Borodin, et al., "Online Computation and Competitive Analysis", Cambridge University Press, New York, NY, 1998, 6 pages.
Buchbinder, N. et al., "The Design of Competitive Online Algorithms via a Primal:Dual Approach", Foundations and Trends in Theoretical Computer Science, vol. 3, Issue 2-3, Feb. 2009, pp. 93-263, 174 pages.
Butler, D., "France Unveils Carbon Tax", Nature, Sep. 15, 2009, 4 pages.
Cho, et al., "Strategic Consumer Response to Dynamic Pricing of Perishable Products", International Series in Operations Research & Management Science, vol. 131, Aug. 2008, pp. 435-458, 36 pages.
Dasu, S. et al., "Dynamic pricing when consumers are strategic: Analysis of a posted pricing scheme", European Journal of Operational Research, vol. 204, Issue 3, 2010, pp. 1-23, 23 pages.
Fiat, A. et al., "Better Algorithms for Unfair Metrical Task Systems and Applications", Proceedings of the 32nd Annual ACM Symposium on Theory of Computing, 2000, New York, NY, pp. 725-734, 20 pages.
Levin, Y. et al., "Dynamic Pricing in the Presence of Strategic Consumers and Oligopolistic Competition", Management Science, vol. 55, No. 1, Jan. 2009, pp. 32-46, 37 pages.
Levin, Y. et al., "Optimal Dynamic Pricing of Perishable Items by a Monopolist Facing Strategic Consumers", Production and Operations Management, 2009, 53 pages.
McGeehan, P., "Heat Wave Report: 102 Degrees in Central Park", The New York Times, Jul. 6, 2010, 17 pages.
Perry, M., "Australian Greens Propose A$23/ton Carbon Tax", Reuters, Jan. 29, 2010, 2 pages.
Pflueger, et al., "Data Center Efficiency in the Scalable Enterprise", Dell Power Solutions, Feb. 2007, pp. 8-14, 7 pages.
Qureshi, A. et al., "Cutting the Electric Bill for Internet-Scale Systems", Proceedings of the ACM SIGCOMM 2009 Conference on Data Communication, Aug. 17-21, 2009, New York, NY, pp. 123-134, 12 pages.
Rasmussen, N., "Implementing Energy Efficient Data Centers", White Paper #114, American Power Conversion, retrieved at <<http://www.apcmedia.com/salestools/NRAN-6LXSHX_R0_EN.pdf>>, 2006, pp. 1-15, 15 pages.
Sleator, D. et al., "Amortized Efficiency of List Update and Paging Rules", Communications of the ACM, vol. 28, Issue 2, Feb. 1985, pp. 202-208, 7 pages.
Sweeting, A., "Dynamic Pricing Behavior in Perishable Goods Markets: Evidence from Secondary Markets for Major League Baseball Tickets", Duke University, Feb. 2010, pp. 1-65, 65 pages.
Wang, C. et al., "Markdown Money Contracts for Perishable Goods with Clearance Pricing", European Journal of Operational Research, vol. 196, 2009, pp. 1113-1122, 10 pages.

"Carbon Tax Center", retrieved at <<www.carbontax.org>>, Aug. 5, 2010, 7 pages.
"Windows Azure Platform", retrieved at<<http://www.azure.com>>, on Aug. 5, 2010, 2 pages.
International Search Report and Written Opinion dated Dec. 23, 2011 from PCT Patent Application PCT/US2011/036364, 8 pages.
Bodik et al., "Response-Time Modeling for Resource Allocation and Energy-Informed SLA's," Proc. Workshop on Statistical Learning Techniques for Solving Systems Problems (MS Sys'07), Dec. 8, 2007, available at <<http://homepages.inf.ed.ac.uk/csutton/publications/sysml.pdf>> on Jul. 27, 2015, 3 pages.
Non-Final Office Action dated Apr. 3, 2013 from U.S. Appl. No. 12/781,445, 11 pages.
Response filed Aug. 2, 2013 to the Non-Final Office Action dated Apr. 3, 2013 from U.S. Appl. No. 12/781,445, 14 pages.
Non-Final Office Action dated Aug. 1, 2011 from U.S. Appl. No. 12/391,188, 12 pages.
Response filed Nov. 16, 2011 to the Non-Final Office Action dated Aug. 1, 2011 from U.S. Appl. No. 12/391,188, 11 pages.
Final Office Action dated Dec. 19, 2011 from U.S. Appl. No. 12/391,188, 17 pages.
Response filed Mar. 19, 2012 to the Final Office Action dated Dec. 19, 2011 from U.S. Appl. No. 12/391,188, 11 pages.
Notice of Allowance dated Apr. 2, 2012 from U.S. Appl. No. 12/391,188, 5 pages.
Non-Final Office Action dated Oct. 7, 2011 from U.S. Appl. No. 12/492,385, 14 pages.
Response filed Jan. 6, 2012 to the Non-Final Office Action dated Oct. 7, 2011 from U.S. Appl. No. 12/492,385, 15 pages.
Final Office Action dated Mar. 15, 2012 from U.S. Appl. No. 12/492,385, 16 pages.
Response filed Jul. 16, 2012 to the Final Office Action dated Mar. 15, 2012 from U.S. Appl. No. 12/492,385, 17 pages.
Notice of Allowance dated Feb. 19, 2013 from U.S. Appl. No. 12/492,385, 6 pages.
Notice of Allowance dated Jul. 18, 2013 from U.S. Appl. No. 12/492,385, 6 pages.
Requirement for Restriction/Election dated Feb. 1, 2013 from U.S. Appl. No. 12/903,227, 6 pages.
Response filed Feb. 27, 2013 to the Requirement for Restriction/Election dated Feb. 1, 2013 from U.S. Appl. No. 12/903,227, 7 pages.
Non-Final Office Action dated Mar. 29, 2013 from U.S. Appl. No. 12/903,227, 16 pages.
Response filed Aug. 22, 2013 to the Non-Final Office Action dated Mar. 29, 2013 from U.S. Appl. No. 12/903,227, 13 pages.
Restriction/Election dated Feb. 28, 2013 from U.S. Appl. No. 13/169,890, 6 pages.
Response filed Mar. 18, 2013 to the Restriction Election dated Feb. 28, 2013 from U.S. Appl. No. 13/169,890, 11 pages.
Non-Final Office Action dated Apr. 15, 2013 from U.S. Appl. No. 13/169,890, 10 pages.
Response filed Aug. 15, 2013 to the Non-Final Office Action dated Apr. 15, 2013 from U.S. Appl. No. 13/169,890, 12 pages.
Final Office Action dated Oct. 9, 2013 from U.S. Appl. No. 13/169,890, 11 pages.
Response filed Jul. 23, 2012 to the Requirement for Restriction/Election dated Jun. 22, 2012 from U.S. Appl. No. 12/951,977, 7 pages.
Requirement for Restriction/Election dated Aug. 2, 2012 from U.S. Appl. No. 12/951,977, 7 pages.
Response filed Aug. 13, 2012 to the Requirement for Restriction/Election dated Aug. 2, 2012 from U.S. Appl. No. 12/951,977, 6 pages.
Non-Final Office Action dated Sep. 4, 2012 from U.S. Appl. No. 12/951,977, 10 pages.
Response filed Nov. 29, 2012 to the Non-Final Office Action dated Sep. 4, 2012 from U.S. Appl. No. 12/951,977, 12 pages.
Final Office Action dated Dec. 17, 2012 from U.S. Appl. No. 12/951,977, 19 pages.
Response filed Apr. 17, 2013 to the Final Office Action dated Dec. 17, 2012 from U.S. Appl. No. 12/951,977, 15 pages.

(56) References Cited

OTHER PUBLICATIONS

Notice of Allowance dated Aug. 29, 2016 from U.S. Appl. No. 13/169,890, 21 pages.
Response filed Aug. 31, 2016 to the First Office Action dated May 4, 2016 from China Patent Application No. 201280032040.3, 23 pages.
Second Office Action dated Oct. 9, 2016 from China Patent Application No. 201280032040.3, 14 pages.
Intention to Grant dated Jul. 15, 2016 from European Patent Application No. 10744134.7, 36 pages.
Decision to Grant dated Oct. 13, 2016 from European Patent Application No. 10744134.7, 2 pages.
Non-Final Office Action dated May 17, 2013 from U.S. Appl. No. 13/169,923, 11 pages.
Response filed Sep. 6, 2013 to the Non-Final Office Action dated May 17, 2013 from U.S. Appl. No. 13/169,923, 14 pages.
Final Office Action dated Dec. 18, 2013 from U.S. Appl. No. 13/169,923, 11 pages.
Response filed Feb. 24, 2014 to the Final Office Action dated Dec. 18, 2013 from U.S. Appl. No. 13/169,923, 18 pages.
Non-Final Office Action dated Oct. 6, 2014 from U.S. Appl. No. 13/169,923, 17 pages.
Response filed Feb. 9, 2015 to the Non-Final Office Action dated Oct. 6, 2014 from U.S. Appl. No. 13/169,923, 19 pages.
Final Office Action dated May 14, 2015 from U.S. Appl. No. 13/169,923, 17 pages.
Applicant Initiated Interview Summary dated Aug. 12, 2015 from U.S. Appl. No. 13/169,923, 3 pages.
Response filed Aug. 24, 2015 to the Final Office Action from U.S. Appl. No. 13/169,923, 16 pages.
Non-Final Office Action dated Jan. 20, 2016 from U.S. Appl. No. 13/169,923, 47 pages.
Response filed Apr. 12, 2016 to the Non-Final Office Action dated Jan. 20, 2016 from U.S. Appl. No. 13/169,923, 14 pages.
Notice of Allowance dated Jul. 13, 2016 from U.S. Appl. No. 13/169,923, 24 pages.
Non-Final Office Action dated Jun. 21, 2012 from U.S. Appl. No. 12/973,399, 20 pages.
Response filed Aug. 27, 2012 to the Non-Final Office Action dated Jun. 21, 2012 from U.S. Appl. No. 12/973,399, 18 pages.
Final Office Action dated Oct. 3, 2012 from U.S. Appl. No. 12/973,399, 25 pages.
Response filed Jan. 23, 2013 to the Final Office Action dated Oct. 3, 2012 from U.S. Appl. No. 12/973,399, 16 pages.
Non-Final Office Action dated Jul. 3, 2014 from U.S. Appl. No. 12/973,399.
Requirement for Restriction Election dated Jun. 7, 2012 from U.S. Appl. No. 12/913,763.
Response filed Jun. 27, 2012 to the Requirement for Restriction/Election dated Jun. 7, 2012 from U.S. Appl. No. 12/913,763, 10 pages.
Non-Final Office Action dated Dec. 31, 2012 from U.S. Appl. No. 12/913,763, 15 pages.
Response filed Apr. 30, 2013 to the Non-Final Office Action dated Dec. 31, 2012 from U.S. Appl. No. 12/913,763, 16 pages.
Notice of Allowance dated Aug. 23, 2013 from U.S. Appl. No. 12/913,763, 9 pages.
Notice of Allowance dated Jul. 7, 2014 from U.S. Appl. No. 12/913,763, 6 pages.
Non-Final Office Action dated Nov. 21, 2012 from U.S. Appl. No. 12/779,059, 24 pages.
Amendment/Response filed Feb. 15, 2013 to the Non-Final Office Action dated Nov. 21, 2012 from U.S. Appl. No. 12/779,059, 9 pages.
Final Office Action dated Apr. 11, 2013 from U.S. Appl. No. 12/779,059, 31 pages.
Requirement for Restriction Election dated Jun. 22, 2012 from U.S. Appl. No. 12/951,977, 6 pages.
First Office Action dated Sep. 16, 2014 from Chinese Patent Application No. 201180024779.5, 12 pages.

Response to Final Office Action filed Nov. 14, 2014 from Chinese Patent Application No. 201080009556.7, 12 pages.
Notice on the Third Office Action dated Dec. 31, 2014 from Chinese Patent Application No. 201080009556.7, 7 pages.
Decision on Rexamination dated Dec. 16, 2014 from Chinese Patent Application No. 201080009556.7, 3 pages.
Examination Report dated Oct. 17, 2014 from European Patent Application No. 10744134.7, 7 pages.
Notice of Allowance dated Nov. 11, 2014 from Japanese Patent Application No. 2011-551110, 7 pages.
Response to Third Office Action filed Mar. 4, 2015 from Chinese Patent Application No. 201080009556.7, 15 pages.
Non-Final Office Action dated Sep. 23, 2014 from U.S. Appl. No. 12/781,445, 12 pages.
Response to Office Action filed Feb. 16, 2015 from European Patent Application No. 10744134.7, 11 pages.
Non-Final Office Action dated Dec. 5, 2014 from U.S. Appl. No. 12/779,059, 20 pages.
Amendment filed Aug. 20, 2014 from U.S. Appl. No. 14/464,650, 8 pages.
Non-Final Office Action dated Apr. 27, 2016 from U.S. Appl. No. 13/169,890, 39 pages.
First Office Action dated May 4, 2016 from Chinese Patent Application No. 201280032040.3, 15 pages.
Response filed Apr. 12, 2016 to the Examination report dated Mar. 21, 2016 from European Patent Application No. 10744134.7, 19 pages.
Terminal Disclaimer and Response filed May 16, 2016 to the Non-Final Office Action dated Apr. 27, 2016 from U.S. Appl. No. 13/169,890, 14 pages.
Response filed Feb. 16, 2016 to the Office Action dated Dec. 16, 2015 from Korean Patent Application No. 10-2011-7019493, 23 pages.
Notice of Allowance dated Feb. 22, 2016 from Korean Patent Application No. 10-2011-7019493, 6 pages.
Examination report dated Mar. 21, 2016 from European Patent Application No. 10744134.7, 5 pages.
Response filed Dec. 8, 2015 to the Examination Report dated Aug. 10, 2015 from European Patent Application No. 10744134.7, 12 pages.
Advisory Action and After Final Consideration Program Decision dated Nov. 9, 2015 from U.S. Appl. No. 13/169,890, 4 pages.
After Final Pilot 2.0 Request and Response filed Oct. 30, 2015 to the Final Office Action dated Jun. 5, 2015 from U.S. Appl. No. 13/169,890, 17 pages.
International Preliminary Report on Patentability dated Aug. 23, 2011 from PCT Patent Application No. PCT/US2010/023253, 5 pages.
International Preliminary Report on Patentability dated Nov. 20, 2012 from PCT Patent Application PCT/US2011/036364, 4 pages.
International Preliminary Report on Patentability dated Jan. 7, 2014 from PCT Patent Application No. PCT/US2012/042110, 6 pages.
Notice of Allowance dated Sep. 24, 2015 from U.S. Appl. No. 12/779,059, 30 pages.
Applicant Initiated Interview Summary dated Sep. 2, 2015 from U.S. Appl. No. 13/169,890, 3 pages.
European Search Report dated Oct. 28, 2014 from European Patent Application No. 12803686.0, 3 pages.
Examination Report dated Dec. 1, 2014 from European Patent Application No. 12803686.0, 4 pages.
Notice on the Second Office Action dated Feb. 21, 2014 from Chinese Patent Application No. 201080009556.7, 10 pages.
Office Action dated Mar. 11, 2014 from Japanese Patent Application No. 2011-551110, 11 pages.
Request for Reexamination filed Jun. 30, 2017 from Chinese Patent Application No. 201280032040.3, 8 pages.
Chatwin, R.E., "Optimal Dynamic Pricing of Perishable Products with Stochastic Demand and a Finite Set of Prices", European Journal of Operational Research 125 (2000), Aug. 1, 1997, pp. 149-174, 26 pages.
"Decision on Reexamination Issued in Chinese Patent Application No. 201280032040.3", dated Aug. 2, 2018, 14 Pages.

(56) References Cited

OTHER PUBLICATIONS

"Notice of Re-examination Issued in Chinese Patent Application No. 201280032040.3", dated May 3, 2018, 10 Pages.
"Office Action Issued in Chinese Patent Application No. 201280032040.3", dated Mar. 20, 2017, 10 Pages.

* cited by examiner

RESOURCE MANAGEMENT FOR CLOUD COMPUTING PLATFORMS

BACKGROUND

Traditionally, entities that owned and/or operated software applications also owned the hardware on which the software applications executed. For example, a person may own a copy of an application program and own a personal computer on which the application program may execute. As another example, a company may own a web service and may own computing resources, including hardware resources like one or more servers and/or networking hardware and software resources like copies of software and licenses for the software, that the web service uses during execution.

Ownership of such computing resources includes many expenditures of both time and money. In addition to the original acquisition costs of hardware, there are costs associated with servicing and upgrading the hardware, as well as future costs in maintaining or replacing the hardware. For software resources, there is original acquisition costs for licenses and there may be maintenance costs associated with such licenses. For software applications that may require a great deal of computing resources, such as web services that may be used by large numbers of people in parallel, the cost of hardware and software to support the software application may be large.

Cloud computing platforms, operated by a cloud operator, allow application owners to execute their software applications without owning the computing resources that the software applications uses to execute. A cloud computing platform includes a pool of computing resources, including hardware such as processors and storage devices. This pool of resources can be partitioned and can be allocated to execute a software application for an application owner. Some platforms partition the resources into virtual machines and each virtual machine can be instantiated and configured to execute a software application. Different virtual machines can be configured to execute different software applications. As a result, the cloud computing platform can be used to execute many different software applications on behalf of multiple application owners.

To execute software applications on the cloud platform, each application owner contracts with the cloud operator. The contracts between the application owner and the cloud operator define categories of virtual machines that are available for executing the software application—such as virtual machines with small, medium, and large amounts of hardware resources—and a billing rate associated with each of the virtual machines. Under the contract, the cloud operator is responsible for making the virtual machines available upon request by the application owner. The application owner is responsible for determining when to request additional resources, what category of resources to request, and when to release those resources back to the cloud computer platform. When the software application is executed and resources of the platform are requested and used by the software application, the cloud operator then bills the application owner for the time used on the requested resources at the rate set under the contract.

SUMMARY

Applicants have recognized and appreciated benefits of a system for managing allocation of resources based on service level agreements between application owners and cloud operators. Under some service level agreements, the cloud operator may have responsibility for managing allocation of resources to the software application and may manage the allocation such that execution of the software application is within an agreed service level. Operating a cloud computing platform according to such a service level agreement may alleviate for the application owners the complexities of managing allocation of resources and may provide greater flexibility to cloud operators in managing their cloud computing platforms.

In some embodiments, a cloud computing platform is configured to allocate resources to a software application such that execution of the software application by the cloud computing platform meets one or more performance levels specified in a service level agreement. Performance levels of a service level agreement may include parameters relating to execution of the software application, such as an execution time for an operation performed by the software application under a specified load to be imposed on the cloud computing platform by the software application. During execution of the software application, the cloud computing platform may monitor performance metrics of the software application and compare values for the performance metrics to performance levels and conditions of the service level agreement. The cloud computing platform can then manage the allocation of resources to the software application such that execution performance of the software application is within the agreed performance levels of the service level agreement when the conditions are met. For example, the cloud computing platform may allocate additional resources when execution of the software application is not within the performance levels or de-allocate resources when the software application is allocated more resources than are necessary for execution to meet the performance levels.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
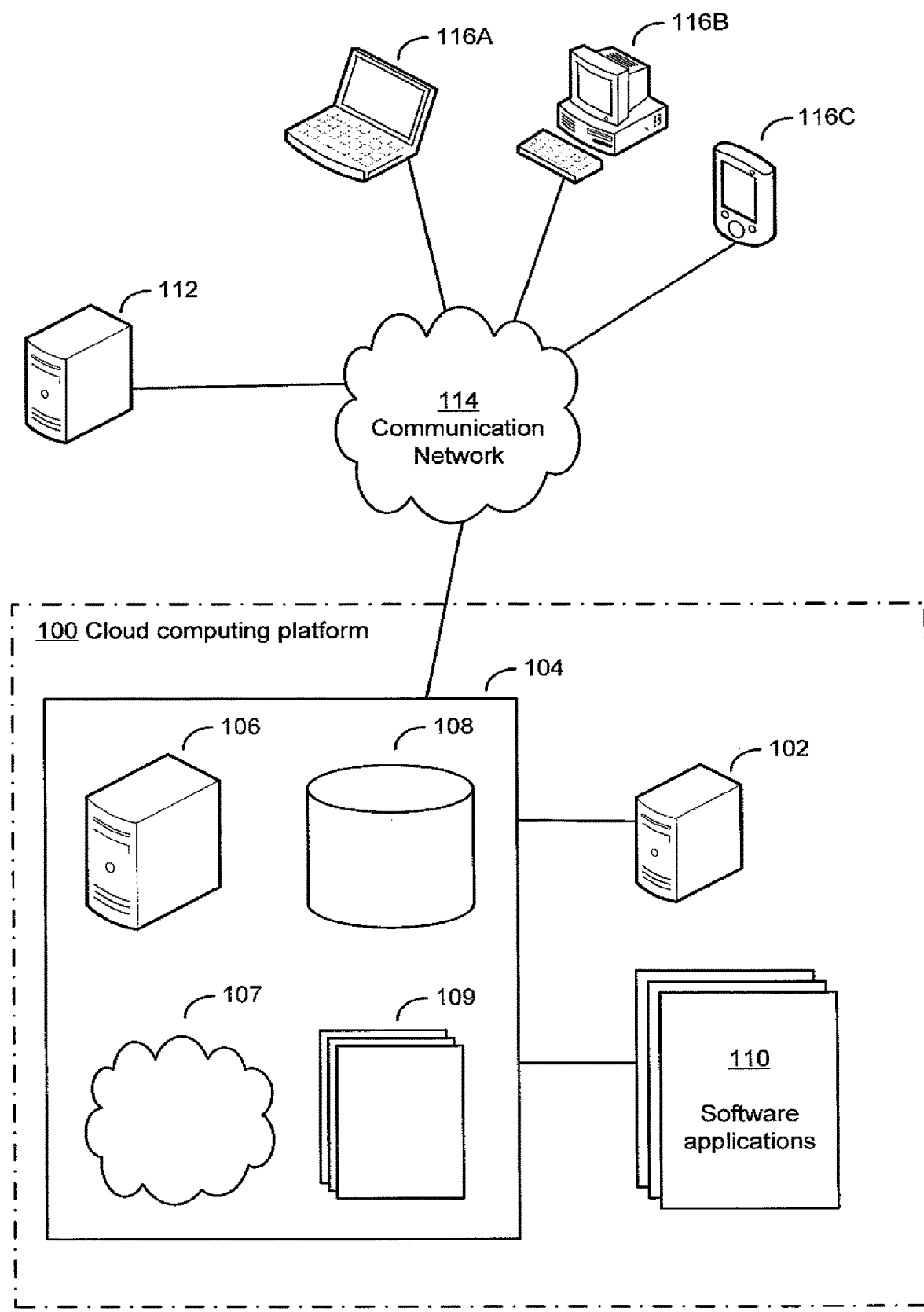
FIG. 1 illustrates an example of an environment in which embodiments of a resource management system may act.

Applicants have recognized and appreciated that current approaches to obtaining computing resources through "the cloud" require active management of allocated resources by an application owner in order to achieve full benefits of the cloud model. An application owner, for example, should monitor load on its application and dynamically increase or decrease resources allocated to execution of the software application by sending requests for changing the allocation to the cloud computing platform. While tools are available to aid an application owner in selecting an appropriate level of resources, there is nonetheless a cost to operating these tools. Moreover, adjustment of resources by the application owner necessarily includes delays. There are delays occurred in the monitoring and processing on behalf of the application owner as well as delays between when an adjustment of the allocation of resources is requested by the application owner and when the adjustment occurs (e.g., when additional resources can be made available by the cloud computing platform and configured for execution of a software application). As a result, allocation requests may be outdated when processed by the cloud computing platform, such that the software application may be allocated more or fewer resources than the software application needs at the time of allocation. Having an application owner actively manage allocation may also lead to inefficiencies for the cloud operator because the cloud operator does not know when an application owner may request more resources.

The Applicants have recognized and appreciated that managing interactions between a cloud operator and an application owner according to a service level agreement (SLA) can address the foregoing issues. In some embodiments of an SLA, an application owner specifies a level of service with which the software application is to be executed by the cloud computing platform. The cloud operator agrees in the SLA to execute the software application by allocating the resources of the cloud computing platform so as to meet that level of service. The SLA may specify an agreed service level with multiple terms. These terms may include any suitable terms and, in some cases, may include a response time to operations handled by the software application (e.g., a request received from a user), a fraction of the operations for which the response time parameter is met, a unit of time over which to measure the fraction, and a volume of requests for which the response time metrics can be met.

Known cloud computing contracts view the cloud computing platform as providing resources to be leased to application owners upon request. A service level agreement, however, views the cloud computing platform as providing a service to the application owner—executing the software application on behalf of the application owner—and therefore includes terms that govern how that service is to be provided. These terms governing the service may include specified performance levels for the software application when executed by the cloud computing platform. With such agreed-upon performance levels in the contract, the application owner can be confident that the software application will perform well for users of the software application or perform well under other circumstances.

In some cloud computing platforms that operate according to such SLAs, the platform may receive via an interface of the platform a specification of terms of the SLA. Terms of the SLA may include one or more agreed performance levels that relate to the service level selected by the application owner and conditions under which the values for the performance levels have been agreed to be met. A performance level may be specified as one or more values for any one or more suitable performance metrics for the software application, such as execution times for operations performed by the software application. The cloud computing platform may be configured according to the SLA to allocate resources of the cloud computing platform to the software application to meet the agreed service level by allocating resources to meet the agreed performance levels of the SLA so long as the conditions of the SLA are met. During execution of the software application, the cloud computing platform may monitor the software application so as to determine values for performance metrics corresponding to the performance levels. The measured values of the performance metrics may be compared to the terms of the SLA that specify performance levels to determine whether execution of the software application by the cloud computing platform is within the agreed-upon service level of the SLA. The cloud computing platform may ensure that execution of the software application is within the performance levels by adjusting an allocation of resources to the software application based on the comparison. For example, if execution of the software application is not within one or more of the performance levels (as indicated by the values of the performance metrics), the platform may allocate additional resources to the software application such that the performance levels will be met. Alternatively, if the performance levels are being met but more resources are allocated to the software application than are necessary for execution to meet the performance levels, some resources may be de-allocated.

Some service level agreements may be specified in a manner that enables transparency between the application owner and the cloud operator. In some embodiments, terms of an SLA may include performance levels that can be tested to determine whether execution of the software application by the cloud computing platform is successfully meeting the performance levels. For example, a total execution time of an operation of the software application, which can be tested by logging a start and end of execution of the operation, can be one of the performance levels of an illustrative SLA. Logs regarding operations of the software application may be viewed by both the cloud operator and the application owner in some embodiments. By using such testable performance levels, an application owner and/or a cloud operator may monitor whether execution of the software application by the cloud computing platform is meeting the agreed service level.

Transparency may also be useful to the cloud computing platform in managing allocation of resources to the software application. In some embodiments, negotiation of an SLA between an application owner and a cloud operator may include determining expected operational characteristics for the software application that may specify, for example, an expected performance of the software application in performing operations when sufficient resources are allocated to the software application. These expected operational characteristics can be used as a condition term of the SLA, such that the cloud computing platform may not have to meet the performance levels terms of the SLA when actual operational characteristics of the software application are below the expected operational characteristics.

For example, when, during execution, measured values of the performance metrics for the software application indicate that execution of the software application by the cloud computing platform is not meeting one or more of the agreed performance levels, the cloud computing platform and/or the application owner may compare actual operational characteristics of the software application to the expected operational characteristics. A response of the cloud computing platform to the execution performance of the software application may depend on that comparison. For example, when the execution of the software application does not meet the performance levels of the SLA (e.g., by performing operations slower than agreed under the SLA), but the actual operational characteristics of the software application are below the expected operational characteristics, a cloud operator may be relieved of the obligation to allocate more resources to the software application. This may be because the blame for the performance may lie more in the software application than in the manner in which the cloud computing platform is executing the software application. Conversely, when the execution of the software application does not meet the performance levels of the SLA, and the actual operational characteristics of the software application are at or above the expected operational characteristics, then the blame for the performance may lie with the cloud computing platform. In this case, the cloud operator may allocate additional resources and/or reduce charges to the application owner or incur some other penalty.

The expected operational characteristics for the software application may be arrived at in any suitable way. For example, the application owner may specify the expected operational characteristics. Additionally or alternatively, the software application may be tested to determine the expected operational characteristics.

The expected operational characteristics may be identified with any suitable level of granularity. In some cases, a software application may include one, two, or more logical parts of the software application. As part of the SLA, expected operational characteristics for each of these logical parts can be identified. In some such cases, the expected operational characteristics for the logical parts may be used in determining agreed performance levels of the SLA between the application owner and cloud operator. For example, an agreed response time for performing an operation (e.g., responding to a request from a user) may be the sum of expected processing times for all of the logical parts when the conditions of the SLA are met, such that the processing time per logical part may be a useful operational characteristic.

The transparency offered by the expected operational characteristics of the logical parts may be of benefit to the cloud operator in managing allocation of resources. During execution of the software application, if execution of the software application by the cloud computing platform is not meeting one or more performance levels of the SLA, the cloud operator can determine whether the logical parts are operating outside the expected operational characteristics, such as by taking longer to execute than expected. If the cloud operator determines that the logical parts are operating outside the expected operational characteristics, then the cloud operator can inform the application owner that problems in execution performance for the software application may be resulting from an error in the software application rather than from a problem caused by the platform. In such a case, under the SLA the cloud operator may be able to charge the application owner a normal rate for executing the software application or otherwise not incur a penalty, as any breach of the service level of the SLA could be attributed to the logical parts not executing as expected.

The expected operational characteristics of the logical parts of the application may also be used by the cloud operator, in some embodiments, to determine a price to charge the application owner under the SLA for execution of the software application at an agreed service level. To execute the software application, resources of the cloud computing platform will be configured to execute as each logical part. The cloud operator may determine a cost of operating the resources (e.g., hardware and/or software resources) as each of the logical parts and may, based on that cost, identify an appropriate price to charge for operating resources to meet an agreed performance level for the entire software application. The cost of operating resources may include current operational costs for the resources, a cost determined from amortizing upfront costs for the resources, and/or any other costs. Embodiments are not limited, however, to scenarios in which a cloud operator obtains cost information for cloud computing resources to operate as a software application or logical parts of the application. Doing so may be beneficial, as it may allow a cloud operator to tailor pricing to particular applications and application owners. However, any of a number of charging models are possible for an SLA, both where logical parts of a software application are considered in the SLA and otherwise. For example, the SLA may be priced on a flat fee basis. The flat fee may be assessed in proportion to increments of time for which an SLA is in effect. Any suitable increment of time may be used, including weekly, daily, hourly, etc. Other charging models are also possible, which also may have prices that are set with or without cost data. For example, the flat fee may be assessed based on operations processed by the cloud computing platform while the SLA is in effect. In some embodiments, the charges under an SLA may depend on multiple factors, in addition to or instead of cost of operating resources. Charges for an increment of time or for processing an operation may be variable, such that higher changes are imposed for time increments of operations processed during periods in which the load on an application is higher. The charging model may be established in advance of or as part of negotiation of an SLA. Costs, where considered as at least part of a charging model, may similarly be established in advance of the negotiations, such as by a declaration of costs by the cloud operator or by testing the software application and/or resources to determine costs. Though, in some embodiments, the cost data may be established after the application owner and cloud operator enter into an SLA and alternatively or additionally may be used to renegotiate or dynamically adjust terms of the SLA or to conditionally apply those terms.

In some embodiments, transparency provided by measuring and reporting operational characteristics of all or a portion of an application may also result in increased communication between the cloud operator and the application owner than would otherwise take place. Though such reporting is not a requirement, either or both of the application owner or cloud operator may perceive operation under an SLA as more desirable when such reporting occurs. For example, the cloud operator may report on execution performance of the software application to the application owner. The report may be done at any suitable time, such as based on a schedule or upon occurrence of a particular event. One event that would trigger a report may be when execution performance of the software application does not meet the agreed service level of the SLA for some threshold percentage of the time. Similar reports may be made if logical parts of a software application do not operate according to expected operational characteristics, for at least some threshold amount of time. For example, if one or more logical parts of the software application are not executing within the expected operational characteristics for the logical parts, the cloud operator may notify the application owner of these events. Alternatively or additionally, reports may also be made when one or more conditions of the SLA are not met, such as when a load imposed by the software application on the cloud computing platform is above an agreed limit on load.

In addition to generating a report, some events may cause the cloud computing platform to refrain from allocating additional resources to the software application, which the cloud platform might otherwise do to meet the performance levels of the SLA. A notification that the cloud computing platform is refraining from allocating additional resources may allow an application owner to take action, such as renegotiating the SLA or making adjustments to the software application. Regardless, by providing reports to the application owner, the application owner may perceive greater value from the cloud platform than without the reports.

Managing interactions between cloud operators and application owners using these new SLAs has various benefits for both cloud operators and application owners.

Under conventional cloud contracts, the application owner was responsible for identifying what type of resource to request, when to request the resource, and when to release a previously-requested resource. Though this resource allocation management could be encoded into software applications, managing cloud resources can be problematic for application owners, particularly application owners who are not familiar with how to make these decisions. The Applicants have recognized and appreciated that difficulties associated with identifying what resources to request and when has led to flawed allocation mechanisms in many software applications. As a result, some software applications execute with insufficient resources, causing delays in the applications, or execute with too many resources, causing the application owners to waste money on resources allocated but not used. Under some types of SLAs described herein, however, the application owner may instead be responsible for specifying a desired level of service, such as by specifying one or more performance levels. Specifying the desired performance level may be easier for the application owner than directly managing allocation of resources.

Cloud operators may also benefit from these new types of agreements. With responsibility for allocation management chiefly placed on the application owners under conventional contracts, the cloud operators could only administer resources in a reactionary manner, changing the resources or allocation only upon receipt of requests from application owners to change allocation. Such resource allocation approaches let to cloud operators keeping physical servers operational when not needed or underutilized. SLAs can allow a cloud operator to reduce costs (e.g., utility costs such as energy costs) by deactivating some underutilized resources. The cloud operator may also better share load among physical resources by avoiding the need to maintain computing resources allocated to software applications that do not require them. As a result, the cloud operator may achieve higher utilization of physical servers, possibly reducing the amount of physical resources needed and the associated capital acquisition costs. Accordingly, under some of the SLAs described herein the cloud operator will have more control over allocation of the resources and may be able to administer the resources making up the cloud more effectively.

In view of the foregoing, described herein are various principles for operating a cloud computing platform to allocate resources so as to meet agreed performance levels of a service level agreement. Below are provided various illustrative embodiments that demonstrate systems and techniques that implement some or all of the principles described herein. It should be appreciated that each of the embodiments described below is merely an example of one way in which these principles may be implemented and that embodiments are not limited to operating in accordance with any of the examples.

FIG. 1 illustrates a computing system comprising a cloud computing platform 100. Cloud computing platform 100 may be any suitable arrangement of resources, operated by a cloud operator, for execution of software applications on behalf of application owners. A cloud operator may be any suitable entity or collection of entities responsible for the cloud computing platform 100. An application owner may similarly be any suitable entity or collection of entities responsible for a software application to be executed by the cloud computing platform 100. For example, either or both of the cloud operator and the application owner may be a human, a collection of humans, a commercial or non-commercial organization, a collection of commercial or non-commercial organizations, or any other suitable entity.

As illustrated in FIG. 1, the cloud computing platform 100 includes various elements, including a resource allocator 102 and resources 104. The resource allocator 102 acts on behalf of the cloud operator to manage allocation of the resources 104 for execution of one or more software applications 110. The software applications 110 are executed by allocated resources of the cloud computing platform 100 on behalf of the application owners. The resources 104 that may be allocated to software applications 110 include any suitable types of resources, including hardware resources, like processing resources 106, networking resources 107, and information storage resources 108, and software resources like software 109. Processing resources 106 may include hardware processors (e.g., microprocessors). Networking resources 107 may include any suitable networking hardware, including input/output hardware like network interface cards (NICs) and transmission hardware like routers, hubs, switches, etc. and networking cable for conveying information that have properties. The networking resources 107 may include resources for use by software application(s) 110 as well as networking resources connecting other resources 104 via any suitable local, wide-area, and/or enterprise communication network. Information storage resources 108 may include any suitable devices or media on which information may be encoded. Software resources 109 may include copies of software that may be used by one or more software applications 110 and/or by the cloud computing platform 100 while executing the software application(s) 110, as well as any suitable licenses for such software. While not illustrated in FIG. 1, resources 104 may also include any suitable utility resources associated with other resources 104 of the cloud computing platform 100. For example, the resources 104 may further include utility resources such as energy resources like electricity. As another example, the resources 104 may further include supporting resources like a waiter or air supply for cooling other resources (e.g., a cooling system for a processing resource 106). Any suitable resources may be included as resources 104 of the cloud computing platform 100.

The resources 104 may be allocated by the resource allocator 102 in any suitable manner. In some embodiments, the resources 104 may be allocated as virtual machines or using any other conventional approach that uses virtualization. In other embodiments, as described in greater detail below, the resources 104 may be allocated in logical groupings termed "resource containers."

The cloud computing platform 100, or any components of the cloud computing platform 100, may exchange information about a software application with a computing device 112 associated with an application owner for the software application. Any suitable type or types of information may be exchanged with the computing device 112, as embodiments are not limited in this respect. For example, information regarding an SLA, about the software application, about a performance of the software application, or about an allocation of resources to the software application may be exchanged between the cloud computing platform 100 and the computing device 112. In addition, in some cases, a software application may be exchanged between the cloud computing platform 100 and the computing device 112, including instructions of the software application and/or information managed by the software application.

The software applications 110 may include any suitable type of application. One type of application is batch applications, which perform predefined processing within a specified period of time. Another type of application is user-interactive applications. User-interactive applications are those applications that interact with a user and include functionality to perform user operations requested by the users. This may be any suitable type of functionality or user operations, as embodiments are not limited in this respect. Users of the software applications 110 may operate user computing devices, such as user computing devices 116A, 116B, 116C to exchange information with the cloud computing platform 100 and with the software applications 110 executing on the cloud computing platform 100. The exchanged information may be, for example, requests for information sent by the user computing devices 116A, 116B, 116C, and responses to the requests sent by the cloud computing platform 100. The user computing devices 116A, 116B, 116C may exchange information with the cloud computing platform 100 via a communication network 114, which may be any suitable one or more wired and/or wireless networks, including the Internet.

When the cloud computing platform 100 is executing software applications 110, some of the resources 104 of the cloud computing platform 100 are allocated to each software application of the applications 110. When the resources are allocated to the software application, the resource may execute instructions of the software application, store information managed by the software application, or perform any other functionality of hardware related to executing a software application. For example, as part of executing the software application, the resources may receive a request for information from a user computing device 116A, process the request, retrieve the requested information, process the requested information, and respond to the user computing device 116A with the requested information.

The amount of resources 104 allocated to each of the software applications may change based on various factors. The resource allocator 102 of the cloud computing platform 100 manages allocation of resources in accordance with service level agreements (SLAs) between the cloud operator and the application owners associated with each of the software applications 100. As mentioned above and described in greater detail below, an SLA between the cloud operator and the application owner may specify a service level that the cloud operator agrees to provide to the application owner. This service level relates to performance with which the cloud computing platform will execute the application owner's software application. Accordingly, some SLAs may include terms that specify one or more performance levels for the software application and one or more conditions under which the performance level(s) will be met by the cloud computing platform.

An SLA may specify performance levels in any suitable manner. For example, the performance levels of an SLA may each specify a particular metric by which performance of a software application may be judged and a value for that metric. A metric may be any suitable quantity indicative of execution performance of a software application. In some cases, the metric may relate to servicing requests received from users. A software application's application owner may desire that the software application respond to a request received from a user with a certain speed. For example, the application owner may desire that the software application respond to a user request with a small enough delay between receiving the request and responding such that the user does not notice any lag in using the software application. This "small enough delay" may be a quantifiable time, e.g., 100 milliseconds, for total processing of a request from a user. An SLA for the software application may then specify the service level requested by the application owner based at least in part on this quantifiable time by specifying this quantifiable time as a performance level of the SLA. A performance level may additionally be defined by one or more measurement specifications that indicate how compliance with the performance metric should be judged. In some cases, a measurement specification may be that execution of the software application should always meet the performance metric, 100 percent of the time. In such a case, using the example above, every user request received would have to be processed within 100 milliseconds for the cloud computing platform to have executed the software application in accordance with the service level. In other cases, a measurement specification may permit for some variation in performance and some exceptions to the performance metric. For example, a measurement specification may indicate that the performance metric should be met with a particular rate of success (e.g., 95 percent of the time) over a specified unit of time (e.g., a day). Any suitable performance metric and measurement specification may be used, as embodiments are not limited to specifying a performance level in any particular way.

Where performance levels are defined at least in part on servicing user requests, any suitable one or more user requests may be used to define performance levels. For example, for a user-interactive application includes multiple types of operations and may receive multiple types of user requests, an SLA may include one or more performance levels related to each of the types of user requests or may include one or more performance levels related to any one of the types of user requests. A user request having a longest time to process may be used to establish the performance level(s) of the SLA, as it may be likely that if the software application meets the performance level(s) for that type of request, then the software application may meet any other performance level for other types of request. Alternatively, an average user request, which may be the user request received most often or a user request having a typical processing characteristics, may be used to establish the performance level(s) of an SLA.

An SLA may be specified using any suitable number of terms, including one or more performance levels and/or one or more conditions under which performance level(s) will be met. Conditions of an SLA may apply to all performance levels of the SLA, such that all the performance levels may be violated when the conditions are not met, or may correspond to particular performance levels of the SLA, such that only the particular levels may be violated when a condition is not met.

One exemplary type of SLA may specify a service level for the SLA using two terms: a performance level and a condition.

The first term of this exemplary type is a performance level relating to a response time for responding to user requests. The performance metric for this response time may be specified as an upper limit on an execution time that is a time for the software application to execute operations to receive, process, and respond to the request. An example of such a performance metric is that "the software application will respond to user requests within 100 milliseconds." The performance level of this example may also be defined with a measurement specification. The measurement specification may be defined in two parts, including a rate of success in responding to user requests within the time specified by the performance metric and a unit of time by which to judge compliance with the rate of success. The rate of success may be specified as a lower limit on an average success rate. An example of this second performance level would be that "90 percent of user requests will" be responded to within the limit set by the first threshold. An example of a unit of time would be that, for user requests received "within each hour," the specified rate of user requests will be responded to within the time limit set by the performance metric.

Each of the three foregoing factors is a specification of a performance level for a software application. Service levels may also be specified according to conditions under which the performance levels of an SLA will be met. The conditions may be specified as scenarios of execution of the software application such that, when the software application is executing in the specified scenario, the performance levels should be met, but when the software application is not executing in the specified scenario, the performance levels may not be met. An example is a condition on a load to be imposed by the software application on the cloud computing platform, such that when the load does not meet the condition, the performance levels of the SLA may not be met. Where a condition on load is used, the condition may be specified in any suitable manner, including by specifying an upper limit on a number of requests received from users in a unit of time. This upper limit is, in other words, a "peak" number of user requests to be processed by the software application in the unit of time. It should be appreciated that this is merely an example and that other limits may be specified, such as an average number of user requests per unit time or a 95-5 metric. A 95-5 metric is specified by, using any suitable metric (e.g., an average) for measuring load over time, collecting multiple values for that metric over time and scaling the values on a scale from 1-100, with the maximum value set to be the 100% value. The value for the metric at 95% on the scale is then accepted as the 95-5 metric. The limit specified by a 95-5 metric is therefore the 95% value specified on this scale. Returning to the "peak" type of limit, an example of the condition is that "under a peak load of 10 user requests per second," the other three metrics will be met.

Assembling the two terms (the performance level and the condition), an example of this type of SLA is that "Under a maximum load of 10 user requests per second, the cloud computing platform will provide sufficient resources such that the software application is able to respond to at least 90 percent of the user requests received in each hour within 100 milliseconds." When this type of SLA is used, the cloud computing platform will execute the software application with the agreed service level when, under the specified condition (the maximum load), the software application meets the performance level (responds to 90 percent of requests received each hour within 100 milliseconds).

Whether the cloud computing platform executes the software application in accordance with the SLA may dependent in part on the amount of resources allocated to the software application. If the cloud computing platform allocates a software application very few resources, but processing a user request requires performing many operations or complex operations, or the software application is under a heavy load and receiving many requests, the software application may take a long time to perform the operations to respond to a single request with the few resources. When this time exceeds a performance level of the SLA, then the cloud computing platform will not be executing the software application in accordance with the SLA. However, these same operations to process a user request under the same heavy load may take less time if more resources were allocated to the software application. With more resources, then, the cloud computing platform may be able to execute the software application such that the operations are performed within the performance levels set by the SLA. Adjusting an amount of resources allocated to the software application may thus enable the cloud computing platform to execute the software application in accordance with the SLA.

As mentioned above, when negotiating an SLA with an application owner, the cloud operator agrees to execute the software application on behalf of the application owner so as to meet the service level specified by the application owner. Executing the software application so as to meet the service level includes executing the software application such that the performance levels specified in the SLA are met. The cloud operator therefore is responsible for allocating resources to the software application such that the software application executes in accordance with the SLA. In the example of FIG. 1, the resource allocator 102 manages allocation of resources 104 to each software application in accordance with the SLA for that application. In particular, the SLA manages the allocation of resources such that the software application executes in a manner that meets the performance levels specified by the SLA, such that the software application meets the overall service level agreed on in the SLA.

The resource allocator 102 may use any suitable technique to allocate resources 104 of the cloud computing platform 100 to each software application being executed by the cloud computing platform 100. Examples of techniques that may be used by the resource allocator 102 are described in detail below. Additionally, the resource allocator 102 may allocate resources in any suitable grouping of resources.

In some embodiments, the resource allocator 102 may directly allocate hardware resources, without any logical grouping of resources. In other embodiments, the resource allocator 102 may allocate resources using virtual machines or any other conventional technique using virtualization. In still other embodiments, the resource allocator 102 may allocate the resources 104 as a logical grouping termed a "resource container."

A resource container may include any suitable type of resource, including multiple types of resources. Some resource containers may therefore include some processing resources and some information storage resources. The amounts of each type of resource to be included in a resource container may vary based on functionality that the resource container is intended to carry out. A "computing container," for example, is one type of resource container that may be configured to execute some of the instructions of a software application to carry out operations for the software application. A computing container may be associated with processing resources to execute the instructions, information storage resources to store data to be processed, being processed, or that was processed by the instructions, and input/output resources to send and receive information including instructions and data. A "data container" in another exemplary type of resource container that may be configured to store information associated with a software application, such as data that was and/or will be processed by the software application. A data container may be associated with information storage resources to store information, processing resources to process requests to store new information or transmit previously-stored information, and input/output resources to receive and respond to the requests.

In embodiments that use resource containers to allocate resources, the resources 104 of a cloud computing platform 100 may be associated with resource containers in any suitable manner, as embodiments are not limited in this respect. In some cases there may be a one-to-one relationship between hardware resources and resource containers. For example, a hardware processor, networking resources, a hardware storage device, and software resources of the cloud computing platform 100 may be associated with only a single resource container, such that all instructions executed at any time by the processor are executed for that resource container and all information stored by the storage device are stored for that resource container. In other cases, there may be a one-to-multiple relationship between hardware resources and resource containers. For example, a hardware processor may be associated with multiple resource containers, such that a hardware processor may execute instructions for different resource containers at different times, the networking resources may have bandwidth allocated to different resource containers at the same or different times, or a hardware storage device may store some information for each of multiple resource containers.

Accordingly, the "amounts" of hardware resources associated with each resource container may be defined in terms of whole portions of hardware resources and/or in terms of fractions of hardware resources. A fraction of a hardware resource may be expressed in any way, including as a fraction of time of use of the hardware resource or a fraction of space of the hardware resource.

It should be appreciated that resources of a cloud computing platform 100 may be allocated in any suitable manner, including by logical groupings, and that resource containers are merely one way that embodiments that use logical groupings may allocate resources.

Figure 2:
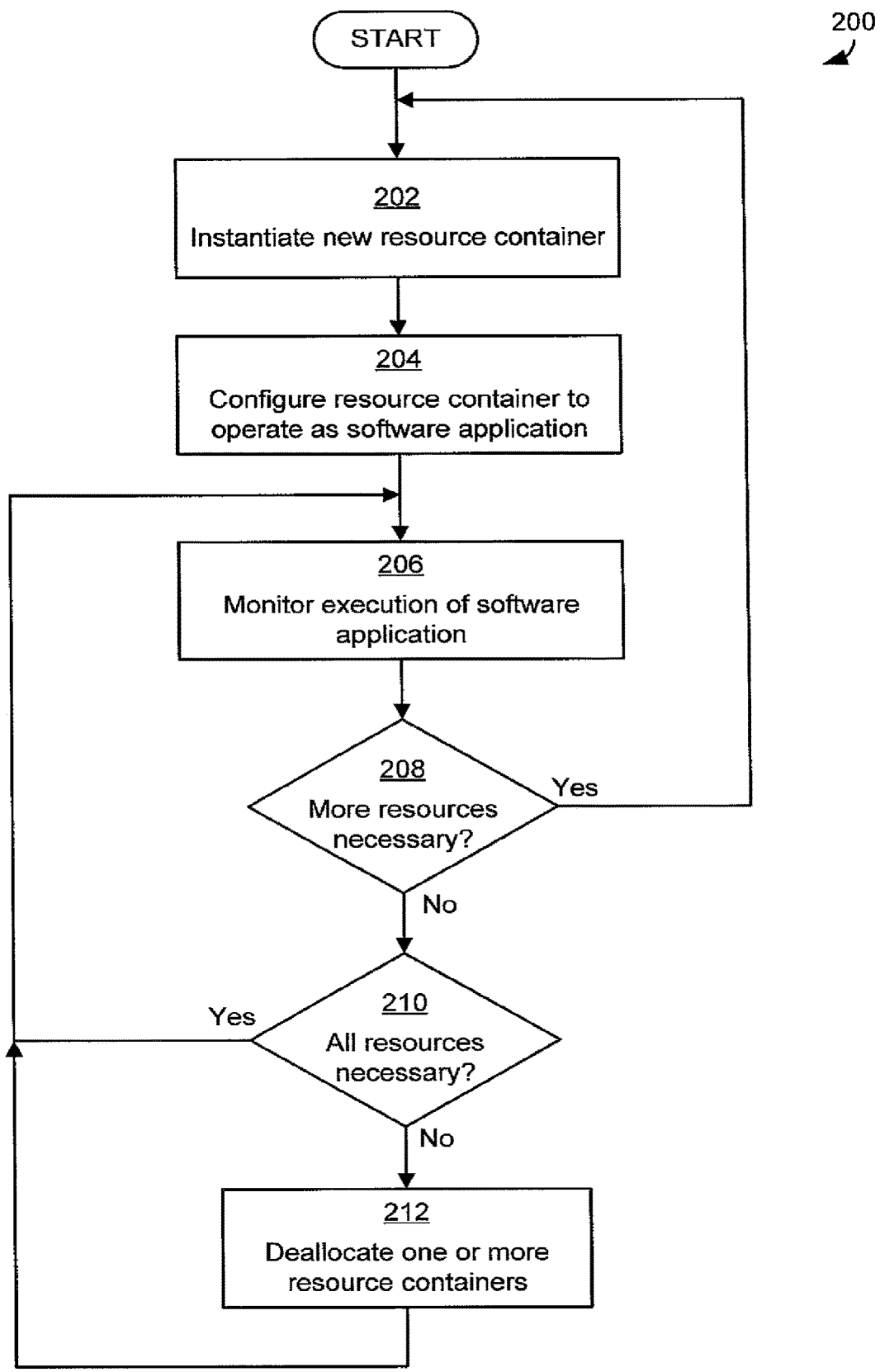
FIG. 2 is a flowchart of an exemplary process for executing a software application on an illustrative type of cloud computing platform.

As mentioned above, a resource allocator 102 may implement any suitable technique for allocating resources to software applications. FIG. 2 illustrates one process that may be used by some embodiments that allocate resources using resource containers.

The process 200 may be used when a cloud computing platform has agreed to execute a software application on behalf of an application owner. Prior to the start of the process 200, the application owner would have provided the software application to the cloud computing platform so that the cloud computing platform can execute the application. In some cases, in addition, the software application may have started executing on some of the resources of the cloud computing platform, while in other cases the software application may not yet have started executing. To execute the software application, resources of the cloud computing platform are allocated to the software application so that instructions of the software application can be executed and information managed by the software application can be stored.

The process 200 begins in block 202, in which the resource allocator instantiates a new resource container. Instantiating a new resource container may include associating some amount of resources of the cloud computing platform with the resource container. The association may involve any suitable actions, including, in some cases, updating records of the cloud computing platform to reflect that the amounts of resources have been associated. Any suitable amount of resources can be allocated, including whole amounts or fractional amounts, as mentioned above.

Once the new resource container is instantiated, in block 204 the resource allocator configures the new resource container to execute the software application. Configuring the resource container to execute the software application may include configuring the resource container to perform at least a portion of the functionality of the software application. For example, for a computing container, the configuring may include providing at least some of the instructions of the software application to the computing container, such that the computing container is able to execute the instructions and perform the functionality of the software application. As another example, for a data container, the configuring may include providing at least some of the information stored by the software application to the data container, such that the data container is able to respond to requests for information managed by the software application.

The resource container, once configured in block 204, will to execute the software application in block 204. Executing the software application includes performing one or more operations of the software application, including by executing instructions and/or managing information. For user-interactive software applications, a resource container configured to act as the software application may process user requests. Processing a user request may include performing any suitable operation(s) requested by a user, including receiving a request for information, processing the request, retrieving the information, processing the information, and transmitting the information to the user who requested the information.

When the resource container is executing the software application, the resource container may be the only resource container executing the software application or may be one of multiple resource containers each configured to act as all or a part of the software application. Embodiments are not limited to any particular manner of operating a set of multiple resource containers as a software application. Where multiple resource containers are used, the resource containers may cooperate to process a single user request or a single user request may be processed entirely by one resource container so that multiple resource containers can operate in parallel to process multiple user requests.

While the one or more resource containers are executing the software application, the resource allocator 102 of the cloud computing platform 100 may monitor the execution of the software application in block 206. Based upon the monitoring, the resource allocator may then determine whether additional resources should be allocated to the software application. The resource allocator 102 may monitor the software application and make this determination in any suitable manner. As discussed in greater detail below, the resource allocator 102 may make determinations regarding allocation based on performance metrics of execution of the software application and on at least one performance level of an SLA for the software application.

In block 208, if the resource allocator 102 determines that more resources should be allocated, then process 200 returns to block 202 in which a new resource container is instantiated in the manner discussed above. If, however, the resource allocator 102 determines that additional resources should not be allocated, then the resource allocator 102 may next determine whether all resources allocated to the software application are necessary for the software application. This determination may be based on the monitoring of block 206 and/or based on any other suitable factors. Again, as discussed in greater detail below, the resource allocator 102 may make determinations regarding allocation based on performance metrics of the software application and on performance levels of an SLA for the software application.

In block 210, if the resource allocator 102 determines that all resources currently allocated to the software application are necessary, then the process 200 returns to block 206 to continue monitoring execution of the software application. If, however, the resource allocator 102 determines that not all resources are necessary, then in block 212 one or more resource containers that are allocated to the software application are de-allocated. De-allocating resource containers may include any suitable actions, including removing from the hardware resources of the resource container instructions and/or information of the software application that were provided to the resource container. In some cases, upon de-allocation, the resource containers may also be de-instantiated. In cloud computing platforms that maintain records of hardware resources associated with resource containers, de-instantiating may also involve updating records of the cloud computing platform to indicate that the hardware resources are no longer associated with a resource container. The hardware resources associated with a de-instantiated resource container may then, in some cases, be turned off or otherwise disabled. Though, in some cases, resource containers may not be de-instantiated following de-allocation, but may instead be made available for future re-allocation.

Once the resource container(s) are de-allocated in block 212, the process 200 continues to block 206 in which the resource allocator 102 monitors execution of the software application, as discussed above.

Figure 3:
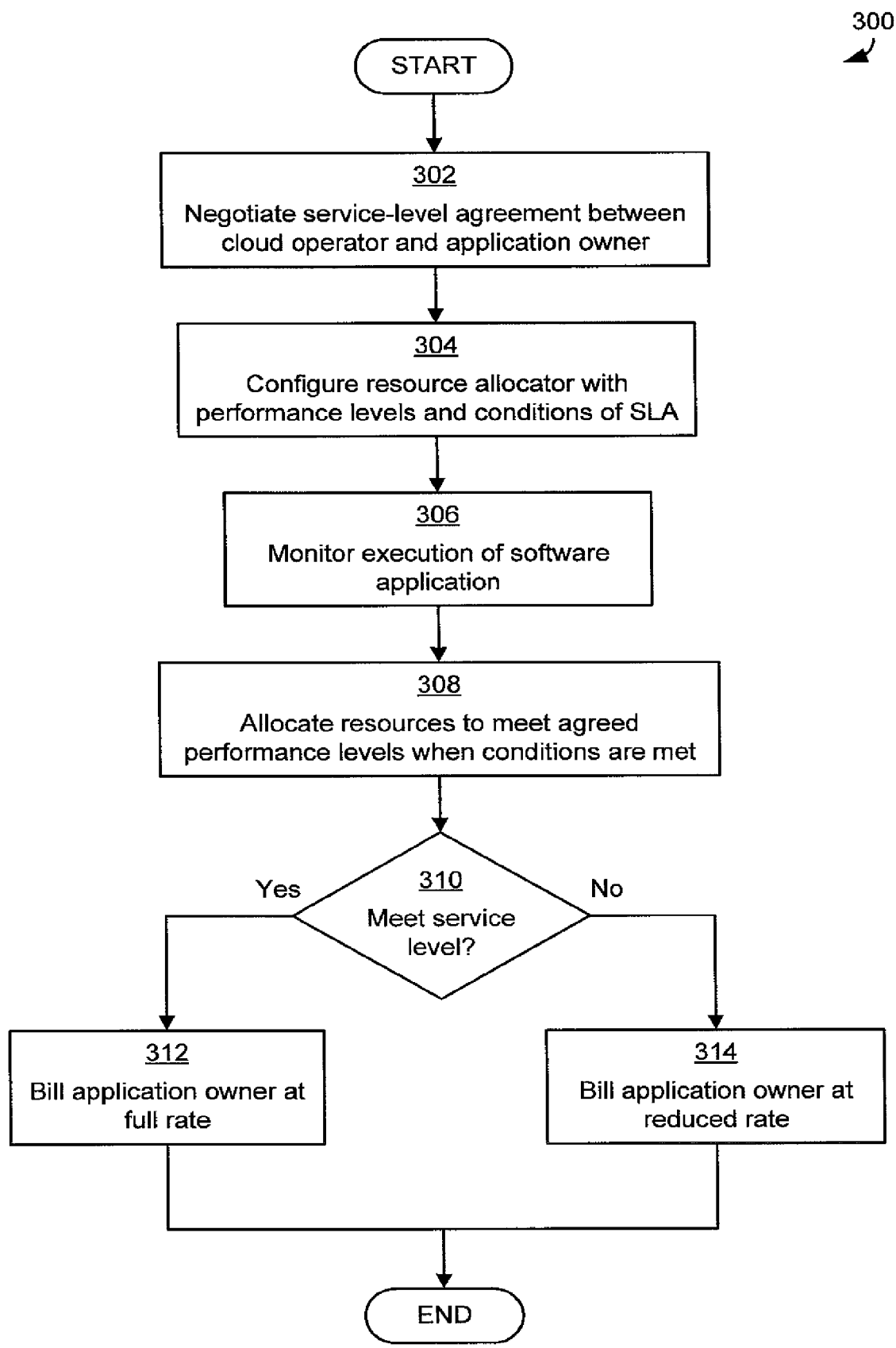
FIG. 3 is a flowchart of an exemplary process for operating a cloud computing platform in accordance with a service level agreement.

In cloud computing platforms operating according to the principles described herein, the cloud computing platform will execute the software application and use allocated resources to execute the software application to meet an agreed service level of a service level agreement. FIG. 3 illustrates one illustrative process that may be used for allocating resources in accordance with a service level agreement.

Prior to the start of the process 300, a cloud operator will have created a cloud computing platform with resources that can be allocated to software applications and may already be executing other software applications for other application owners. An application owner may also have created or taken responsibility for a software application.

In block 302, the cloud operator and the application owner negotiate an SLA for executing the software application in the cloud computing platform. Negotiating the SLA may include negotiating one or more terms of the SLA. The negotiation may take place in any suitable manner. In some cases, the negotiation may be a traditional negotiation process on each of the terms of the SLA. In other cases, the cloud operator will have made available pre-set SLAs having established service levels and prices, such as one or more SLAs per type of software application or SLAs guaranteeing varying levels of service. In such latter cases, the negotiation may involve selecting one of the pre-set SLAs and ensuring that the software application is one that can be executed according to that SLA (e.g., the service level can be met by the cloud computing platform).

The terms of the SLA may include service level terms, such as performance levels that will be met by the cloud computing platform when executing the software application and conditions under which the performance levels will be met. The performance levels may be any suitable levels, including limits on performance metrics and/or scenarios in which the limits will be met. Any suitable performance levels may be performance levels of an SLA, including the example discussed above: a performance metric that is a limit on execution time and a measurement specification that is a limit on success rate and a unit of time for measuring that success rate. Additionally, any suitable condition may be a condition of an SLA, including the example discussed above: a limit on an execution load, under which the performance levels will be met. For some cloud computing platforms, other terms can be included as well. For example, for a cloud computing platform with multiple data centers, a term of the SLA may specify which data center(s) will be used to execute the software application. In these cases, an application owner may wish to specify a data center that is geographically close to the users of the software application to improve performance for the users. As another example, the application owner or cloud operator may specify as a condition of an SLA a cap on an amount of resources to be allocated to the software application. This cap may be any suitable limit, as embodiments are not limited in this respect. Application owners may include caps for any reason, including keeping costs of executing the software application low by using fewer resources. Cloud operators may also cap an amount of resources allocated to a software application, so as to limit the resources that will be consumed by a software application. Additionally, as discussed briefly above and discussed in greater detail below in connection with FIGS. 6-8, as another condition of an SLA, the application owner and cloud operator may define expected operational characteristics that the software application will meet when being executed by the cloud computing platform.

Further, negotiating an SLA may include negotiating different performance levels and/or conditions for different times of day, week, or year. For example, an SLA may have different performance levels and different conditions for morning versus night time, or weekdays versus weekends. In some such cases, a condition relating to load may be different between morning and night as the software application may typically be under a heavier load at night than during the day.

In addition to performance levels and conditions, the terms of the SLA may include billing terms, such as amounts that the cloud operator will bill the application owner for executing the software application. The amounts may be any suitable amounts according to any suitable breakdown, as embodiments are not limited in this respect. In some cases, the amount to be billed may be based on an amount, quality, or exclusivity of resources allocated to the software application per unit of time, such that the billing is based on use of resources. A quality of resources may be related to any suitable characteristics of the resources, such as the throughput or total capacity of resources. Exclusivity of resources may relate to whether the resources allocated to the software application may, under the SLA, be concurrently allocated to other software applications. In some SLAs, resources may be limited to being allocated to a single software application at a time, while other SLAs may permit allocation to multiple software application. In some cases where amount, quality, and/or exclusivity of resources is considered as part of billing, the cloud operator may determine a price to charge based on a cost of operating the resources, such as operating expenditures and capital expenditures, and set a price based on the costs. Where costs fluctuate (e.g., utility costs like electricity), the SLA may include terms relating to a variation in the price to charge based on that fluctuation. In other cases, instead of being based on resource consumption, the amount to be billed may be a fixed amount per unit of time, such as a fixed amount per day, month, or year. In still other cases, a billing may be dependent on performance metrics of the software application during execution, such as an execution load imposed by the software application on the cloud computing platform. For example, an SLA may have different prices that may be charged based on a number of user requests received in each unit of time: one price for up to 100 requests/second, a higher price for up to 1000 requests/second, another higher price for up to 10,000 requests per second, and so on. The prices charged for each level may not rise linearly with the number of requests (or other metric) because, in some platforms, the amount of resources necessary to handle a higher load does not rise linearly with the load. Further, some SLAs may have terms related to billing for software applications that have "bursty" loads rather than substantially constant or slowly-varying loads, because it may be more difficult for the cloud operator to allocate resources effectively for a quickly-varying load. For applications with "bursty" loads, the price to charge may be based on a peak load imposed by the software application on the cloud computing platform, under a load amount determined using the 95-5 technique described above, or using any other suitable metric. Lastly, where the software application is not a user-interactive application, but is instead another type of application such as a batch application, the pricing may be based on a number of operations that are to be carried out in a unit of time and/or a time deadline by which to finish executing all operations of the batch application. For example, the pricing may be based on a load imposed by the software application at any time and/or on the tightness of a deadline by which the operations must be completed.

Additionally, in some cases, billing terms may also include discounts or compensation that may be provided to the application owner when the service level of the SLA is not met by the software application.

Though, it should be appreciated that SLAs can vary widely and have any suitable terms that may be accepted by a cloud operator and an application owner. Embodiments are not limited to operating in accordance with SLAs having any particular service level or billing terms.

Once the terms of the SLA have been negotiated, including the terms of the agreed service level and the billing terms, then the cloud operator configures the cloud computing platform to execute the software application in accordance with the SLA. This may include providing the software application to the cloud computing platform to be executed as well as configuring components of the cloud computing platform to execute the software application in accordance with the SLA. In particular, in block 304, the cloud operator configures the resource allocator of the cloud computing platform to allocate resources to the software application such that the software application meets the agreed service level. Configuring the resource allocator may include providing performance levels and conditions of the SLA for the software application to the resource allocator of the cloud computing platform. To configure the cloud computing platform, the terms of the SLA may be received by the cloud computing platform in any suitable manner, including via any suitable interface (e.g., hardware interface, software interface, network interface, application programming interface (API), or user interface) of the cloud computing platform.

Once the cloud computing platform is configured with the SLA for the software application, the software application may be executed by the cloud computing platform in a manner that meets the agreed service level of the SLA. More particularly, the software application may be executed such that performance metrics for the software application are within the performance levels of the SLA.

To execute the software application in accordance with the service level of the SLA, the resource allocator monitors the execution of the software application and, in block 308, the resource allocator of the cloud computing platform allocates resources based on the monitoring. The monitoring and allocating may be performed in any suitable manner. For execution, the monitoring of block 306 may determine an execution performance of the software application. Monitoring may be done using any suitable technique, including known performance monitoring techniques. The execution performance determined from the monitoring may be compared to the agreed service level of the SLA to determine whether the software application is executing in accordance with the agreed service level, is not executing in accordance with the agreed service level, or risks not executing in accordance with the agreed service level. Based on the comparison, the resource allocator may then, in block 308, adjust an amount of resources allocated to the software application such that the execution performance is in accordance with the agreed service level by meeting the performance levels when the conditions are met. The allocating of block 308 may include either allocating more resources or de-allocating some previously-allocated resources.

As a result of the monitoring of block 306, the cloud computing platform may also determine whether the execution performance for the software application met the agreed service level of the SLA. Billing for execution of the software application may be adjusted based on this determination. If, in block 310, the cloud computing platform determines that the execution performance met the service level, then the cloud operator in block 312 bills the application owner at a full rate. However, if the cloud computing platform determines that the execution performance did not meet the service level, then the cloud operator in block 314 bills the application owner at a reduced rate. The full rate may be the rate negotiated in block 302, while the reduced rate may be the full rate as adjusted by the discounts or compensation negotiated in block 302.

In the example of FIG. 3, once the cloud operator bills the application owner in block 312 or block 314, then the process 300 ends. Though, in some cases, the process 300 may continue, as the software application may continue to be executed indefinitely by the cloud computing platform. In such cases, the process 300 may continue in block 306 with the resource allocator monitoring execution of the software application.

Figure 4:
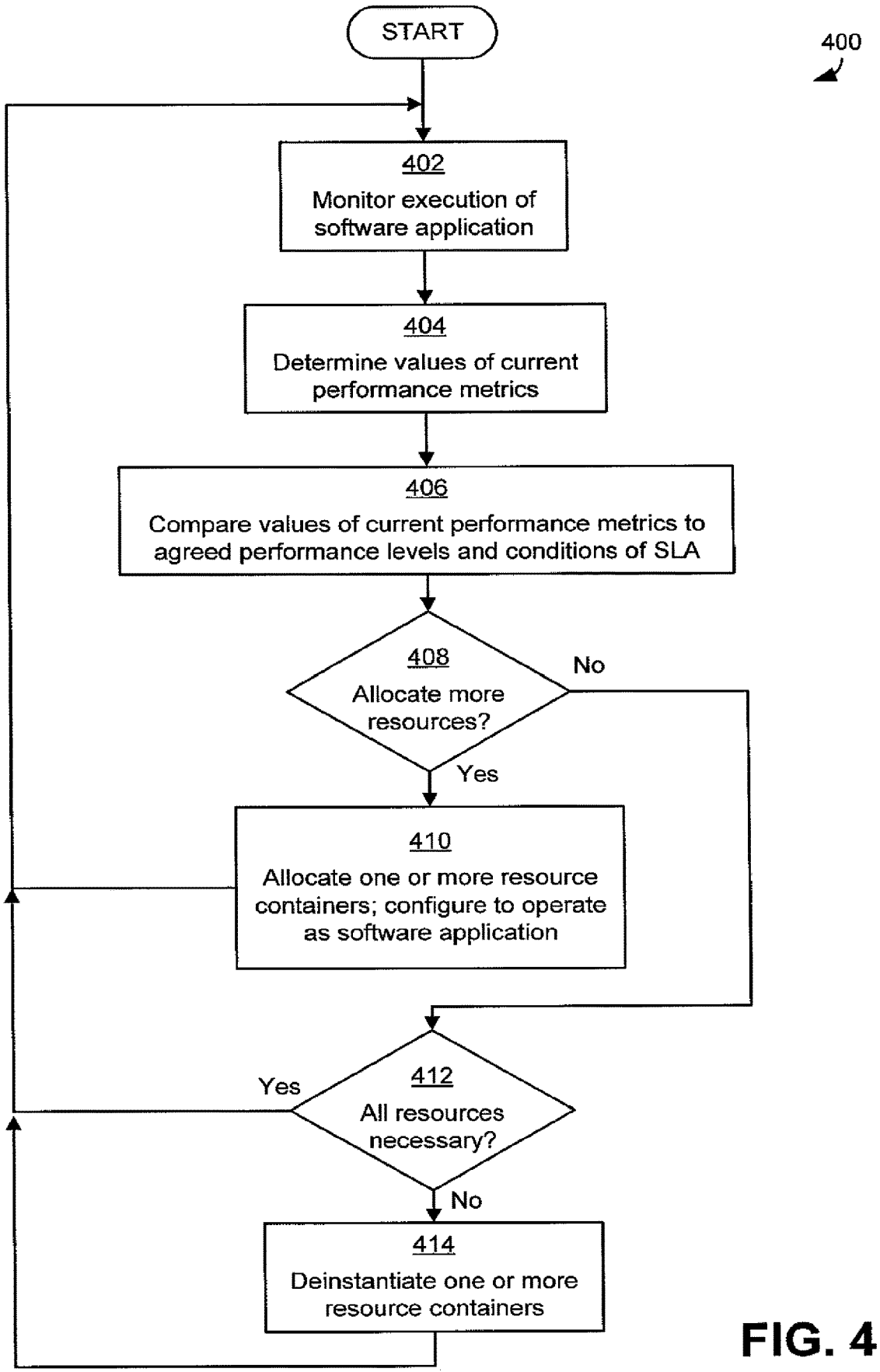
FIG. 4 is a flowchart of an exemplary process for managing allocation of resources to a software application in accordance with a service level agreement.
Figure 5:
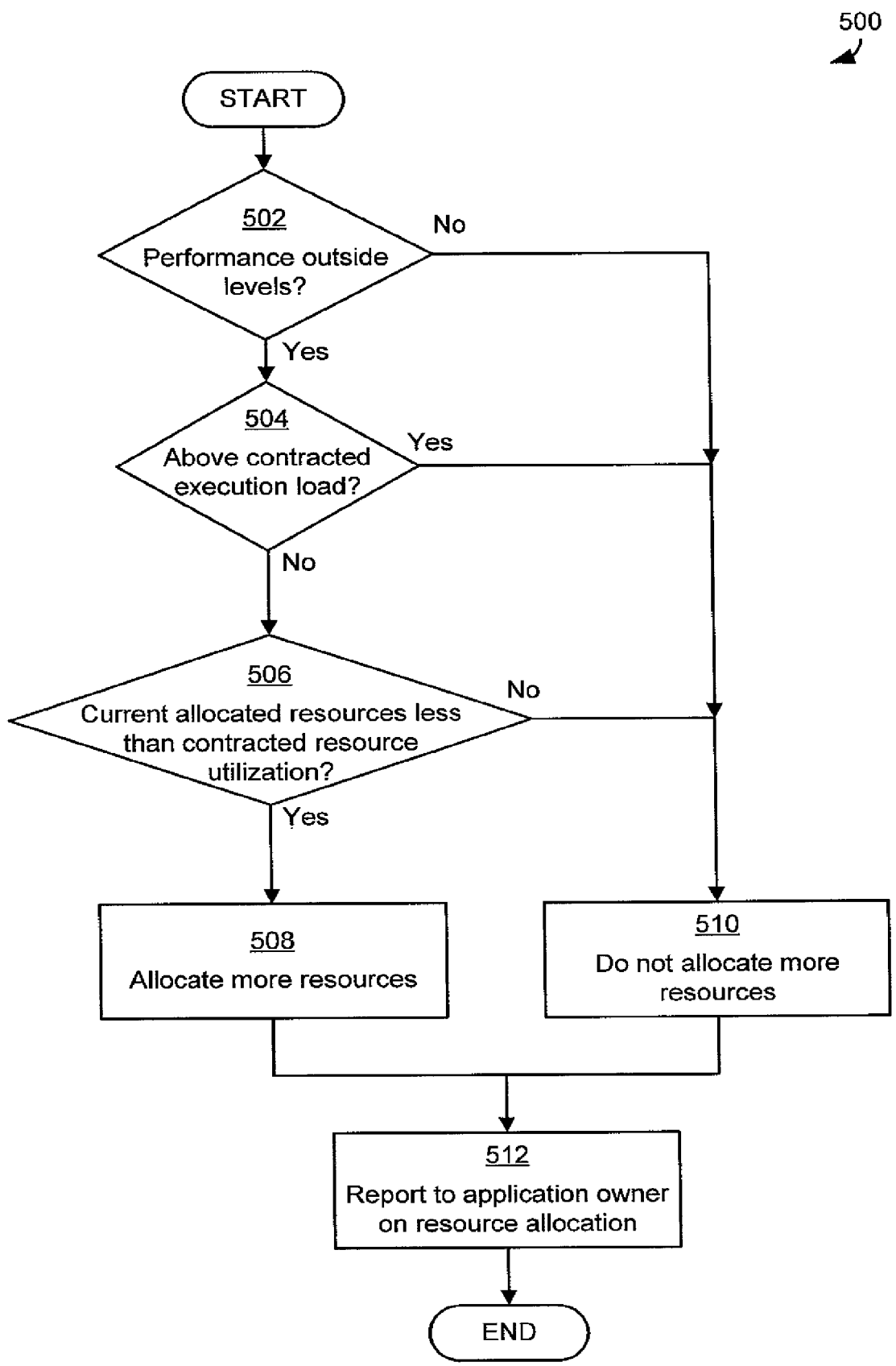
FIG. 5 is a flowchart of an exemplary process for determining whether to allocate additional resources to a software application.

Blocks 306 and 308 were described generally in the example of FIG. 3. FIGS. 4 and 5 illustrate one way in which the monitoring of blocks 306 and 308 of FIG. 3 may be implemented by a resource allocator in some embodiments.

Prior to the start of process 400 of FIG. 4, an SLA for a software application has been negotiated and a cloud computing platform has been configured to execute the software application in accordance with the SLA. The cloud computing platform has also started executing the software application using resources of the software application.

The process 400 begins in block 402, in which a resource allocator of the cloud computing platform monitors execution of the software application in the cloud computing platform. The monitoring of block 402 may be performed in any suitable manner, including by observing the software application directly or by reviewing logs regarding the software application generated by the cloud computing platform. Through the monitoring of block 402, information about operations performed by the software application over time may be collected. This information may include timing information, such as a start and stop times for operations, a number of operations carried out in units of time, the types of operations carried out, or any other suitable information about operations.

In block 404, the resource allocator reviews the information collected through the monitoring to determine values of performance metrics for the software application. Performance metrics may be any suitable indicators of performance of the software application. An indicator of performance may be an indicator relating to operations of the software application or an indicator relating to outside factors that influence operations of the software application. For example, one performance metric may be a total execution time for an operation of the software application. As another example, a performance metric may be a measure of a number of user requests received by the software application in a particular time. In some cases, the performance metrics determined in block 404 may be metrics that relate to performance levels and/or conditions specified in the SLA. Some or all of the performance levels of the SLA may relate to measurable factors related to execution performance of the software application, which are performance metrics for the software application. In such a case, the performance levels of the SLA may therefore specify desired levels for the measurable factors and the current performance metrics may indicate a current value of each of those measurable factors.

In block 406, once the performance metrics are determined, the resource allocator compares the current values for performance metrics to the performance levels and the conditions. The comparison of block 406 may be done to determine whether the cloud computing platform is executing the software application in accordance with the service level of the SLA. This may be done by comparing each performance metric to a related performance level or condition. Where a performance level is specified in the SLA as a limit, the comparison may be done to determine whether a value of the performance metric is within the limit. For example, where a performance level specifies an upper limit on execution times for an operation of the software application and a performance metric is a current value for an execution time for an operation of the software application, the comparison may determine whether the current value is below or above the upper limit. This comparison may be carried out for each pair of performance metrics and performance levels or performance metrics and conditions.

A result of the comparison of block 406 may then be used by the resource allocator to manage an allocation of resources for the software application. The resource allocator may determine, based on the comparison, that the cloud computing platform is not executing the software application in accordance with the service level agreed on in the SLA. The resource allocator may also determine whether cloud computing platform may violate the service level soon. The resource allocator may determine that the cloud computing platform may violate the service level soon using any suitable analysis. For example, such a determination may be made when the values of the performance metrics for the software application are close to the related performance levels. The resource allocator may additionally or alternatively consider a historical performance of the software application, such as loads previously imposed on the software application at particular times of day or days of the week or year, or loads imposed at any other time. In sum, the resource allocator may use any suitable criteria to perform efficient management of resources allocated to software applications and to determine how many resources should be allocated to the software application such that the software application will execute in accordance with the service level of the SLA.

Accordingly, in block 408 the resource allocator determines whether additional resources may be allocated. If so, in block 410, one or more resource containers can be allocated and configured to execute as the software application. Exemplary techniques for allocating and configuring resource containers were discussed above in connection with FIG. 2. The number of resource containers that are instantiated and allocated in block 410 may vary and may be selected based on the comparison of block 406. As discussed above, allocating more resources to the software application may aid the cloud computing platform in executing the software application in accordance with the agreed service level. The amount of resources that are allocated may be selected based on whether and how much the cloud computing platform is violating the agreed service level or how likely the cloud computing platform is to violate the agreed service level soon. Where the violation or risk is low, fewer resources may be allocated than if the violation or risk is high. In addition, the number of resource containers allocated in block 410 may be based on performance information about the resource containers and/or the software application. The performance information may indicate a performance contribution of a single resource container (or type of resource container) as the software application or as a part of the software application. The comparison of block 406 may determine an amount of actual or possible deviation from the agreed service level, determine how many resource containers should be instantiated and configured to correct that deviation, and then allocate that amount of new resource containers.

Once the resource containers are allocated and configured in block 410, the process 400 continues to block 402 in which the resource allocator monitors the software application.

In block 408, the resource allocator may alternatively determine that additional resources should not be allocated, such as when the current values for performance metrics indicate that the cloud computing platform has allocated sufficient resources to execute the software application within the performance levels of the SLA. In this case, the process 400 continues to block 412 the resource allocator may determine whether all the resources currently allocated to the software application are necessary for the software application to execute in accordance with the SLA. The resource allocator may make this determination again based on the comparison of block 406. For example, if the current performance metrics indicate that the execution performance of the software application is far within the performance levels, the resource allocator may determine whether the software application would still meet the performance levels if some resources were de-allocated. The resource allocator may make this determination again based on a performance contribution of a single resource container (or type of resource container) as the software application or as a part of the software application. The resource allocator may review this performance contribution and determine the impact of removing one or more resource containers from the software application. If the impact would be such that the software application would likely still execute in accordance with the SLA (using any suitable technique or evaluating any suitable factors to determine the likelihood, including current values for performance metrics or historical loads), then in block 412 the resource allocator determines that some resources are not necessary. In block 414, the resource allocator then de-allocates one or more resource containers, such as using the processes discussed above in connection with FIG. 2. Once the resources containers are de-allocated, or Wall resources were necessary, the process 400 continues to block 402 in which the cycle continues with monitoring of execution of the software application.

A resource allocator may use any suitable technique to determine whether to allocate additional resources to a software application. In some cases, the resource allocator may determine not to allocate additional resources to a software application, even where the software application is operating outside some of the performance levels. FIG. 5 shows an example of one such process 500 for determining whether to allocate additional resources when the software application is operating outside at least one performance level of the SLA.

Prior to the start of the process 500, a resource allocator will have been configured with performance levels for an SLA for a software application and will have collected current performance metrics for the software application in any suitable manner.

The process 500 begins in block 502, in which the resource allocator determines whether the current values for performance metrics of the software application indicate that the execution performance of the software application is outside the performance levels of the SLA. This determination may be made based on any suitable performance levels of the SLA. In some cases, this determination may be made for the performance levels that indicate a limit on execution metrics.

If the resource allocator determines that the execution performance is outside these performance levels, then the resource allocator may next examine the performance levels regarding the condition(s) in which the performance limits will be met by the software application.

As discussed above, one example of a term describing a condition in which performance limits will be met relates to a limit on an execution load that a software application may impose on the cloud computing platform. For user-interactive applications, this load may be expressed in terms of a limit on a number of user requests to receive in a given period of time. When that limit is exceeded (e.g., when a lot of user requests are being received), the cloud computing platform may not be required to execute the software application so as to meet the performance limits. Accordingly, in block 504 the resource allocator may determine whether the current execution load imposed by the software application on the cloud computing platform is above the contracted execution load.

If the execution load is not above the contracted load, then in block 506 the resource allocator may examine other conditions. Another condition that may be included in some SLAs relates to a cap on the amount of resources that may be allocated to a software application under the SLA. Accordingly, in block 506, the resource allocator may review a current allocation of resources to the software application to determine whether a current allocation of resources is at or above a contracted amount of resources. If the current allocation is not at or above the contracted amount, then in block 508 additional resources may be allocated to the software application via any suitable technique, including techniques described above.

However, if the resource allocator determines, in block 502, that the performance levels are not exceeded, or determines that the conditions of the SLA are met by determining, in block 504, that the execution load is not exceeded and determining, in block 506, that the current resource allocation is below the cap, then additional resources are allocated in block 510.

Once the resource allocator determines to allocate additional resources or determines not to allocate additional resources, in block 512 the resource allocator may also report back to the application owner on the status of the software application. To ensure transparency under the SLA, the cloud operator may occasionally report to the application owner on factors relating to execution of the software application. These factors may include performance metrics for the software application, resource allocation to the software application, and indications of whether the execution of the software application by the cloud computing platform violated one or more of the performance levels of the SLA. The report to the application owner may also include information on circumstances under which the cloud computing platform violated the performance levels but more resources were not allocated, such as when the load is above the limit or the resources allocated have reached the cap.

Once the report is generated in block 512, the process 500 ends.

While in the example of FIGS. 3, 4, and 5, the cloud computing platform monitored performance metrics of the software application being executed by the cloud computing platform and allocated resources based on current values of those performance metrics, embodiments are not limited to performing monitoring in this manner.

In some embodiments, the cloud computing platform may alternatively or additionally monitor the resources that have been allocated to a software application and allocate resources based on the monitoring of the resources. For example, a cloud computing platform may monitor the resources allocated to a software application to determine whether the resources are operating correctly or otherwise operating as expected. Such monitoring may determine whether any of the resources allocated to the software application have failed or are operating improperly, such as operating with delays. Such monitoring of resources may be performed in any suitable manner, including known techniques for monitoring resources, as embodiments are not limited in this respect. If, as a result of this monitoring, any resources are determined to be operating incorrectly or not as expected, the resource allocator of the cloud computing platform may adjust an allocation of resources. This adjustment may be performed in any suitable manner. For example, the resource allocator may allocate additional resources to compensate for any improper functioning of previously-allocated resources, so as to provide a certain level of resources to provide a certain level of performance via those resources. As another example, the resource allocator may deallocate improperly-functioning resources and allocate replacement resources to the software application. By monitoring the resources and ensuring that the resources that are allocated to the software application are providing a sufficient level of performance, the cloud computing platform can try to ensure that the software application is executing within the performance levels of an SLA.

Software applications to be executed by cloud computing platforms operating according to principles described herein may be arranged in any suitable manner to execute any suitable operations. In addition, resources of the cloud computing platform may be allocated to the software application and configured to execute the software application in any suitable manner.

In some embodiments, a software application can be arranged as a set of one or more logical parts. A logical part of a software application may be any suitable grouping of functionality of the software application. In some cases, a grouping of functionality may be a grouping of functionality related to achievement of a particular task or type of task or performance of a particular operation or type of operation. Embodiments are not limited to operating with any particular types of logical groupings.

Figure 6:
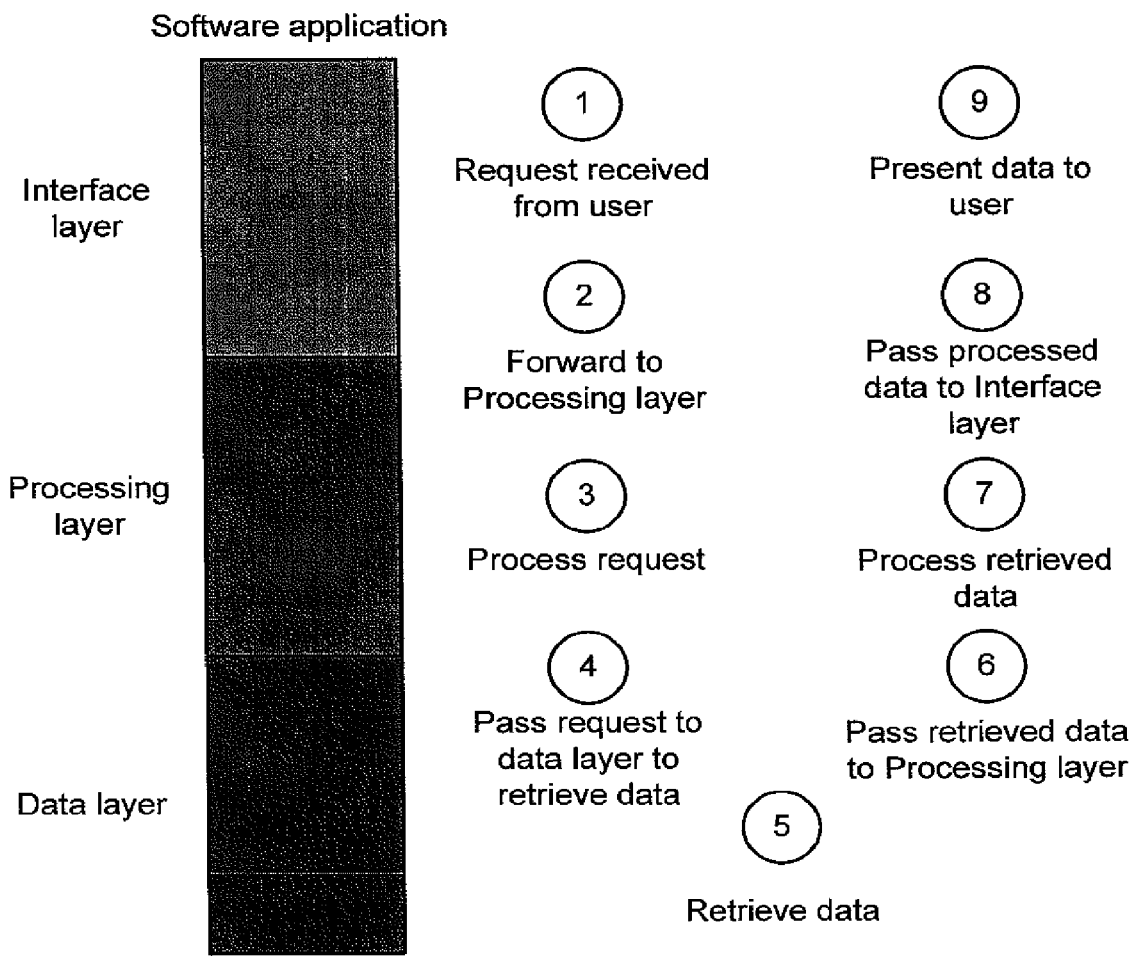
FIG. 6 illustrates a manner in which a software application may be divided into logical parts.

In some cases, the logical parts of a software application may be parts that interoperate to process fully a request for information received from a user, but that each performs different processing to fulfill that request. FIG. 6 illustrates one example of a way in which a software application can be divided into logical parts.

In the example of FIG. 6, to fully process a user request for information, a software application may include functionality related to interacting with a user, functionality related to processing the request, and functionality related to managing information related to the request (e.g., retrieving data from storage). These groupings of functionality may be used as the logical parts of the software application. The software application of FIG. 6 therefore includes three logical parts: an Interface layer, a Processing layer, and a Data layer. FIG. 6 also illustrates the processing path for a user request received by the software application. Using the arrangement of logical parts specified in FIG. 6, in step 1 a user request is first received by the software application via the Interface layer, which has responsibility for interacting with a user and/or user computing device. The Interface layer may next, in step 2, forward at least a part of the request to the Processing layer. In step 3, the Processing layer may perform any suitable processing on the user request, such as processing information provided to the software application as part of the user request or carrying out operations requested by the request. The user request may include a request (express or implied) that some information managed by the software application be retrieved from storage and provided to the user. Accordingly, in step 4, information related to the request (which may include at least a part of the request received by the Processing layer) is provided to the Data layer. In steps 5 and 6, the Data layer retrieves the requested information from a data storage associated with the software application and passes the retrieved data to the Processing Layer. In step 7, the Processing layer again performs any suitable processing on the retrieved information so as to ready the retrieved information for the user and provide the information requested by the user. Following the processing, the Processing layer provides the information to the Interface layer in step 8 and, in turn, the Interface layer relays the information to the user in step 9. Processing of the request is then complete. It should be appreciated that this sequence of steps is, first, merely illustrative of the steps that may be executed by the logical parts and, second, not intended to be an exclusive representation of the steps of these logical parts. For example, while the Processing layer is not illustrated retrieving any information, the Processing layer may retrieve some information, including information to determine how to process user requests or information received from the Data layer. Similarly, while the Data layer is not illustrated performing any processing, the Data layer may perform some processing, including processing to determine what information is requested, how to retrieve the information, and how to provide the information to the Processing layer, or perform processing to convert retrieved information from a format suitable for storage to a format suitable for processing. Any suitable operations may be performed by the logical parts.

In embodiments where software applications are arranged as logical parts, a cloud computing platform may execute the logical parts in any suitable manner. For example, the cloud computing platforms may allocate resource containers to the logical parts of the software application. A resource container, when allocated to the software application and configured to act as the software application, may be configured to act as a logical part of the software application. In embodiments that allocate resources using computing containers and data containers, using the illustrative layers of FIG. 6, at least one computing container may be configured to act as the Interface layer, at least one computing container may be configured to act as the Processing layer, and at least one data container may be configured to act as the Data layer. Configuring the resource containers in this manner may include providing to the resource containers (i.e., the computing and data containers) the instructions implementing the layers and information managed by each of the layers.

Logical parts of a software application may also be used, in some embodiments, in determining an SLA for a software application. As discussed above, as part of negotiating an SLA, a cloud operator and an application owner may agree on performance levels for the software application as a whole. Whether the cloud computing platform meets these performance levels when executing the software application may be dependent on performance of the logical parts of the software application. For example, where the SLA specifies as a performance level an upper limit on execution times for responding to user requests, whether the cloud computing platform is able to execute the software application so as to meet the performance level may depend on execution speeds of each of the logical parts in responding to a request. If any one of the logical parts of the software application is under-performing and taking longer than expected to execute, the software application as a whole may take longer to execute. The cloud computing platform may then be unable to execute the software application so as to meet the performance limit specified in the SLA, regardless of the resources allocated to the software application.

Because the software application may be unlikely to meet other performance levels of the SLA when the logical parts are not executing as expected, expected operational characteristics for the logical parts may be included in the SLA as conditions of the SLA. Conditions, as mentioned above, relate to the scenarios under which the performance levels will be met by the cloud computing platform when executing the software application. When the conditions are not met, then the cloud operator may be allowed, under the SLA, to let the performance levels of the SLA not be met. Additionally, expected operational characteristics for the logical parts may be used to determine the agreed performance levels of the SLA. In some embodiments, when determining the performance levels that will be met by the software application when executed by the cloud computing platform, values for the performance levels may be calculated based on expected operational characteristics of each individual logical part and total expected operational characteristics. This may be done in these embodiments such that the performance levels agreed on in the SLA are achievable in view of the expected operational characteristics of the logical parts. Additionally, the expected operational characteristics may be used to set the amounts of resources and/or the number of resource containers that will be allocated by the cloud computing platform to each logical part so as to meet the agreed performance levels of the SLA when executing the software application. Examples of these determinations made based on the expected operational characteristics are provided below.

Identifying the logical parts and expected operational characteristics for the logical parts during negotiation of the SLA may aid in increasing transparency between the cloud operator and application owner under the SLA. The expected operational characteristics of the logical parts may be related to performance metrics for the logical parts, in that the expected operational characteristics may be values for expected performance metrics for the logical parts. The expected operational characteristics may therefore be related to measurable factors of performance for each of the logical parts, such as an expected execution time for operations of a logical part. Monitoring of the software application during execution may provide information about whether the actual operational characteristics of a logical part were below the expected operational characteristics. The logical parts operating outside the expected operational characteristics can provide an explanation as to why execution of the software application violated performance levels of the SLA when the cloud computing platform allocated what appeared to be sufficient resources to the software application. The information gleaned from the monitoring may be provided from the cloud operator to the application owner so as to explain any violation. Because the information would indicate that the violation occurred as a result of the logical parts executing outside the performance parameters, the fault for the violation of the performance levels can therefore be traced to the logical parts and the application owner. The cloud operator could then justify billing the application owner a full amount under the SLA rather than applying any discount.

Figure 7:
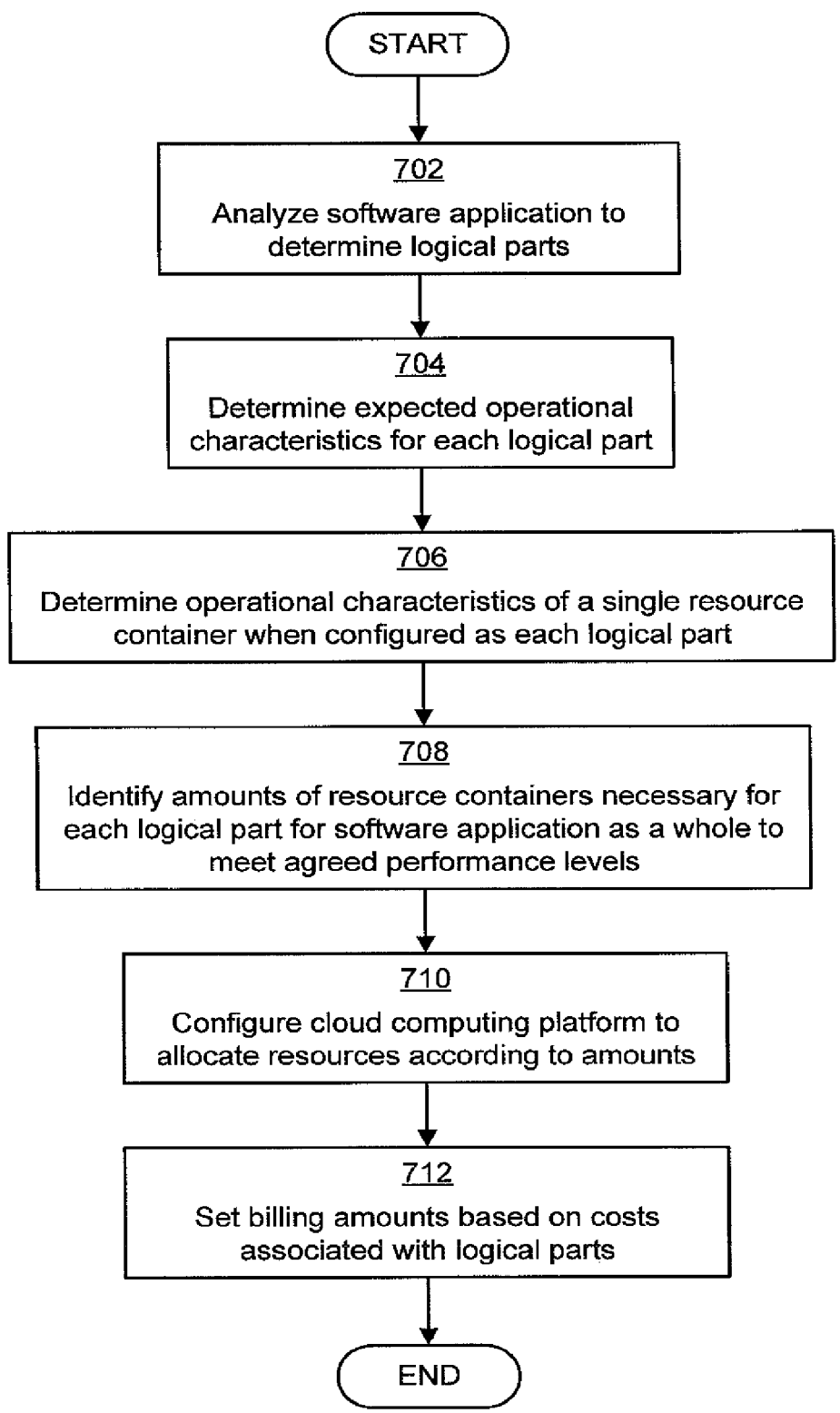
FIG. 7 is a flowchart of an exemplary process for configuring a cloud computing platform to allocate resources to logical parts of a software application.

FIG. 7 illustrates one exemplary process that may be used in embodiments for negotiating an SLA regarding a software application having multiple logical parts and for configuring a cloud computing platform to execute such an application. While the process 700 will be described as being performed by the cloud operator, it should be appreciated that embodiments are not so limited. Rather, in some embodiments, at least some of the actions of process 700 may be performed by the application owner or a third party that may analyze and/or certify operational characteristics of software applications or logical parts of software applications.

The process 700 of FIG. 7 begins in block 702, in which a cloud operator analyzes a software application to determine the logical parts of the software application. The analysis may be performed in any suitable manner, including by a manual or automatic analysis. To determine the logical parts, the instructions of and/or information managed by the software application may be analyzed to determine logical groupings of functionality. For example, all instructions related to a user interface may be identified as one logical grouping.

Once the logical groupings are identified, in block 704 the cloud operator identifies expected operational characteristics for each logical part. The expected operational characteristics that are identified may be individual for each logical part. The expected operational characteristics may be expected values for performance metrics for the logical part during execution. One example of such an expected operational characteristic may be an execution time for the logical part. Any suitable operational characteristic(s) may be identified in block 704 and/or used to judge performance of a logical part during execution. Identifying the expected operational characteristics in block 704 may also be performed in any suitable manner, including by testing the logical part and/or software application in any suitable environment.

The process 700 may also include making some determinations regarding how to allocate resources to the software application, during execution of the software application, such that execution of the software application as a whole meets the performance levels of the SLA. In particular, the cloud operator may determine, based on the expected operational characteristics for a logical part, how many resources (e.g., resource containers) should be allocated to the logical part and/or to the software application to meet the agreed service level of the SLA for the software application as a whole. To do so, in block 706 the cloud operator may determine expected operational characteristics of each logical part by determining operational characteristics of a single resource container executing as each logical part. The operational characteristics may relate to any suitable measure of performance, including through measuring values of performance metrics related to the performance levels of the SLA. For example, a number of user requests able to be serviced in a unit of time by the single resource container may be determined.

Through measuring the expected operational characteristics of a single resource container configured to execute as each logical part, the cloud operator may then determine a number of resource containers that may be used for the logical parts, operating together on the allocated resource containers, to meet the performance levels and conditions of the SLA. This may be done, in block 708, by comparing the execution performance of a single resource container to the overall execution performance required by the performance levels of the SLA to determine the number of resource containers, each having the identified execution performance, that will together meet the performance levels and conditions.

For example, one SLA for a three-level application may specify that 90 percent of user requests will be serviced within 100 milliseconds under a peak load of 10 requests/second. When a single resource container is configured as the Interface layer, the resource container may be able to service a request in 10 milliseconds and can process 10 requests/second. When a single resource container is configured as the Processing layer, the resource container may be able to service a request in 20 milliseconds and can process 5 requests/second. When a single resource container is configured as the Data layer, the resource container may be able to service a request in 50 milliseconds and can service 2 requests per second. Assembling those numbers, it can be seen that the performance level for execution time will be met by the single resource containers (10+20+50 milliseconds is less than the 100 millisecond performance level), but that a single resource container configured as the Processing and Data layers cannot meet that performance level under the condition regarding the number of user requests to be handled per second. A single resource container acting as the Interface layer can service 10 user requests per second, but a single resource container acting as the Processing layer can only service 5 user requests per second, Accordingly, 2 resource containers configured as the Processing layer will be necessary to meet the execution load performance level of the SLA. Similarly, 5 resource containers configured as the Data layer will be necessary. Accordingly, in this example, the software application will need to be allocated 1+2+5=8 resource containers to ensure that the cloud computing platform executed the software application within the performance level of the SLA under the condition of the SLA.

In block 710, once the amounts of resource containers necessary to meet the performance levels and conditions have been identified in block 708, the cloud operator configures the resource allocator of the cloud computing platform to allocate resources according to the determined amounts. The resource allocator may not be configured to always allocate those determined amounts, as the execution load of the software application may not always be at the peak execution load, but the resource allocator may be configured to use the amounts to determine how to allocate resources. For example, by monitoring values for actual operational characteristics of each of the logical parts, when the resource allocator determines that the actual operational characteristics for one or more of the logical parts are causing overall execution performance of the software application to stray near the performance levels of the SLA, the resource allocator may be able to determine that there is a problem with the logical part. Similarly, based on the determined amounts, the resource allocator may be able to determine how many resources should be necessary for the software application to be executed in accordance with the SLA in that scenario, through analyzing the expected operational characteristics for the logical parts. If allocating more resources would exceed the amount of resources that should be necessary, based on the expected operational characteristics of the logical parts, the resource allocator may be able to determine that there is a problem with one or more logical parts of the software application.

In block 712, the cloud operator may also set billing amounts for the SLA based at least in part on costs associated with the logical parts. The costs associated with the logical parts may include the costs associated with operating resources (e.g., resource containers) as the logical parts. Additionally or alternatively, any of the illustrative billing mechanisms discussed above may be used in embodiments in which a software application is divided as logical parts.

Once the resource allocator is configured in block 710, the process 700 ends. Following the process 700, the cloud computing platform may execute the software application in accordance with the determinations made during the process 700.

Figure 8:
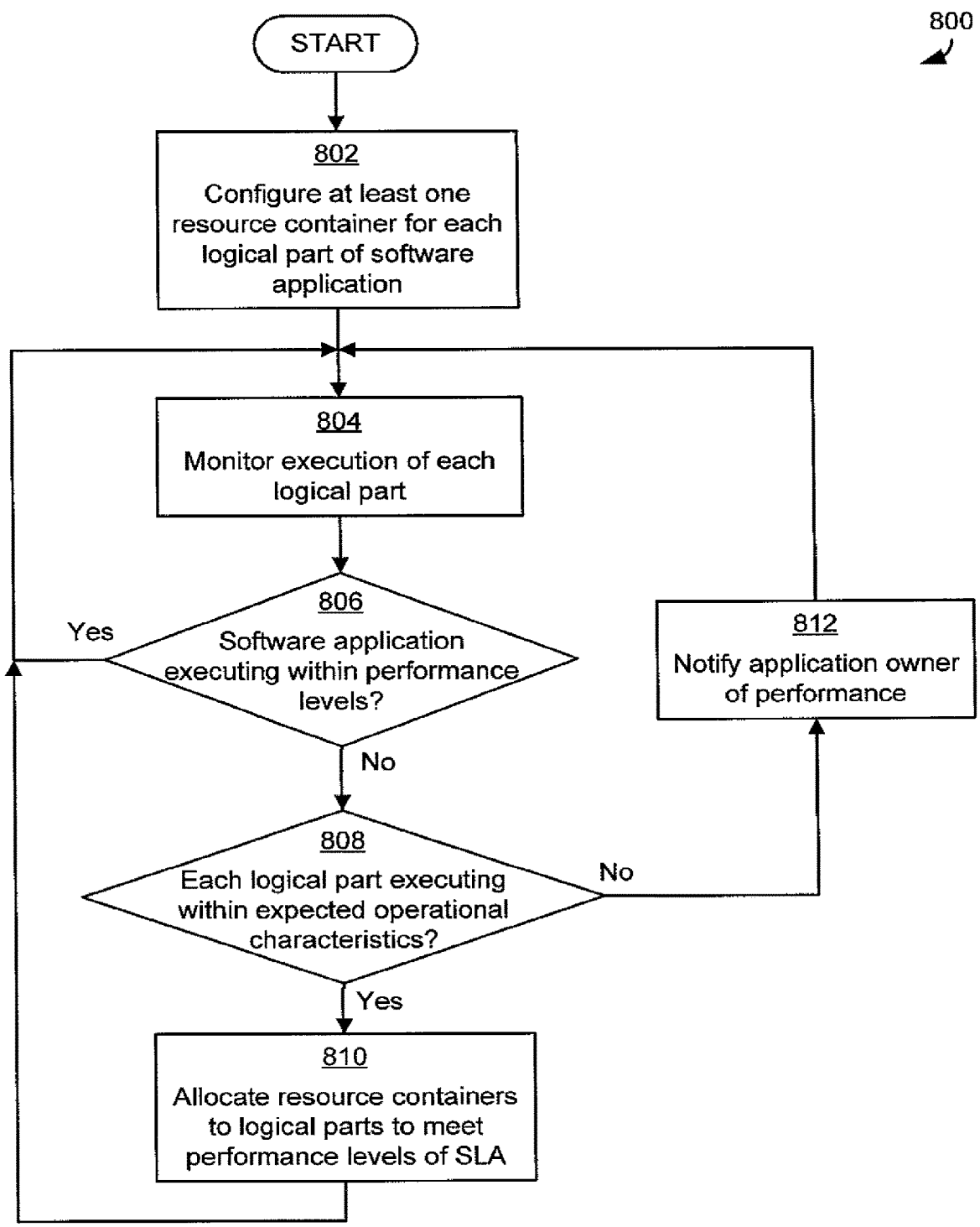
FIG. 8 is a flowchart of an exemplary process for managing allocation of resources to logical parts of a software application.

FIG. 8 illustrates one technique that may be used in some embodiments by a resource allocator for allocating resources to logical parts of a software application. The process 800 of FIG. 8 begins in block 802, in which the resource allocator configures, for each of the logical parts of the software application, at least one resource container to act as the logical part. Once the resource containers are configured, the resource containers may execute the software application and service user requests.

In block 804, the resource allocator may monitor execution of the logical parts using any of the exemplary techniques described above. For example, the resource allocator may directly observe execution of the logical parts or may review logs generated during execution of the logical parts. As a result of this monitoring, the resource allocator may determine values for actual operational characteristics for each of the logical parts and for performance metrics for the software application as a whole.

The resource allocator may then compare the values for the actual operational characteristics for the logical parts to the expected operational characteristics for the logical parts, and compare values for current performance metrics for the software application to performance levels of the SLA and to conditions of the SLA.

In block 806, the resource allocator may determine whether the cloud computing platform is executing the software application as a whole within the performance levels of the SLA. If execution of the software application as a whole is meeting the performance levels, then the process 800 returns to block 804 to continue monitoring execution of the logical parts. If, however, execution of the software application as a whole is not executing in accordance with the performance levels of the SLA, then in block 808 the resource allocator may determine whether the logical parts are executing with the expected operational characteristics. Though, the expected operational characteristics may relate to characteristics of the logical parts in processing a single user request, while the performance levels of the typically SLA relate to performance of a software application in processing multiple user requests over time. As a result, in some cases the determination of block 808 may not be merely determining whether any logical part exceeded any expected operational characteristic in processing any request. A single operation of a single logical part may not impact performance of the overall software application so much as to cause a violation or likely violation of performance levels of the SLA. Instead, the determination of block 808 may be, in some cases, whether actual operational characteristics of the logical parts exceed the expected operational characteristics by a threshold amount. The threshold may be any suitable threshold. For example, the threshold may be a number of logical parts that exceed the expected operational characteristics, such as that all logical parts exceed the expected operational characteristics. As another example, the threshold may be a degree by which a logical part exceeds the expected operational characteristics, such as that one or more actual operational characteristics are more than double or more than 10 times the expected operational characteristics. As another example, the threshold may be a consistency with which a logical part is exceeding the expected operational characteristics, such as a rate of exception or a total number of exceptions. In some cases, a combination of thresholds may be used, such as any of the foregoing examples and/or other thresholds.

If the logical parts are determined to be executing within the expected operational characteristics, then the resource allocator can determine that the violation of the performance levels by the cloud computing platform may be due to an allocation of insufficient resources to the software application. Accordingly, in block 810 one or more additional resource containers may be allocated to one or more of the logical parts such that execution of the software application by the cloud computing platform would meet the performance levels of the SLA. The number of resource containers allocated and the logical part(s) to which the resource containers are allocated may be determined in any suitable manner. For example, the allocation may be determined based on the expected operational characteristics for the logical parts, such that the logical parts that may soon execute outside the expected operational characteristics are provided sufficient resources to execute within the performance parameters. As another example, each logical part of the software application may be allocated additional resources in proportion to a number of user requests queued by the logical part. Though, it should be appreciated that any suitable factors may be considered in allocating resources and that resources may be allocated in any suitable manner, as embodiments are not limited in this respect. Once allocated, the additional resource containers may also be configured to act as the logical parts to which the resource containers are allocated.

Once the additional resource containers are allocated and configured, the process 800 returns to block 804 to continue monitoring execution of the software application.

If, however, in block 808 the resource allocator determines that the logical parts are not executing within the performance parameters—by determining that a single operation or a single logical part exceeds or by considering any suitable threshold(s)—the resource allocator can determine that the violation of the performance levels is not due to an insufficient allocation. The resource allocator may instead determine that the violation is due to a problem with one or more of the logical parts. For example, one or more logical parts may be taking too long to execute operations of the logical parts. The resource allocator may consider one of the conditions of the SLA breached, which is the condition that the logical parts will execute with the expected operational characteristics. As a result of the breached condition, the resource allocator may then refrain from allocating additional resources to the logical parts. Instead, the resource allocator may maintain the current allocation of resources and, in block 812, notify the application owner of the performance of the logical parts. The notification of block 812 may include any suitable information, including information related to performance metrics for the logical parts.

Once the application owner is notified in block 812, the process 800 returns to block 804 to continue monitoring execution of the software application.

Techniques operating according to the principles described herein may be implemented in any suitable manner. Included in the discussion above are a series of flow charts showing the steps and acts of various processes for operating a cloud computing platform to execute a software application in accordance with a service level agreement (SLA). The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a web service, for example as a web service such as Windows Azure®, available from the Microsoft Corporation of Redmond, Wash.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 906 of FIG. 9 described below (i.e., as a portion of a computing device 900) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device/processor, such as in a local memory (e.g., an on-chip cache or instruction register, a computer-readable storage medium accessible via a bus, a computer-readable storage medium accessible via one or more networks and accessible by the device/processor, etc.). Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 9:
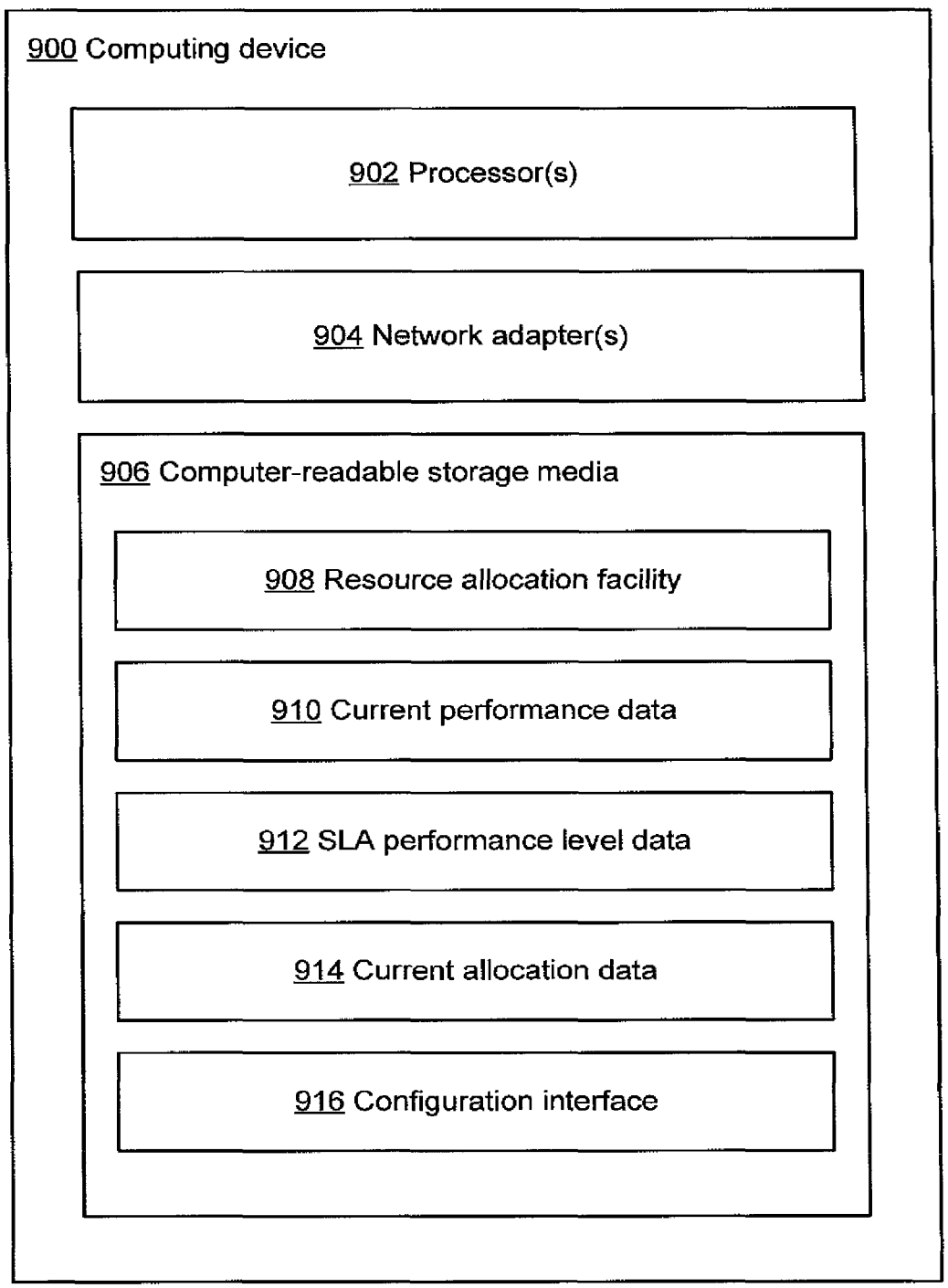
FIG. 9 is a diagram of an exemplary computing device that may be used as a resource allocator in some embodiments.

FIG. 9 illustrates one exemplary implementation of a computing device in the form of a computing device 900 that may be used in a system implementing the techniques described herein, although others are possible. The computing device 900 may be, for example, a resource allocator of a cloud computing platform. It should be appreciated that FIG. 9 is intended neither to be a depiction of necessary components for a computing device to operate in accordance with the principles described herein, nor a comprehensive depiction.

Computing device 900 may comprise at least one processor 902, a network adapter 904, and computer-readable storage media 906. Computing device 900 may be, for example, a desktop or laptop personal computer, a server, a networking element, or any other suitable computing device. Network adapter 904 may be any suitable hardware and/or software to enable the computing device 900 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 906 may be adapted to store data to be processed and/or instructions to be executed by processor 902. Processor 902 enables processing of data and execution of instructions. The data and instructions may be stored on the computer-readable storage media 906 and may, for example, enable communication between components of the computing device 900.

The data and instructions stored on computer-readable storage media 906 may comprise computer-executable instructions implementing techniques which operate according to the principles described herein. In the example of FIG. 9, computer-readable storage media 906 stores computer-executable instructions implementing various facilities and storing various information as described above. Computer-readable storage media 906 may store a resource allocation facility 908 that may implement any of the techniques described herein to monitor execution of a software application and manage allocation of resources to the software application. The computer-readable storage media 906 may also include a data store 910 of current performance metrics for one or more software applications executing on the cloud computing platform, which may have been collected and/or calculated as a result of monitoring performed by the resource allocation facility 908. The computer-readable storage medium 906 may also include a data store 912 of information on SLAs for the software application(s), including information on performance levels and service levels of the SLAs, as well as a data store 914 including information on what resources of the cloud computing platform are allocated and to what. The computer-readable storage media 906 may further include a configuration interface 916, which may be any suitable interface including a network interface and a user interface, by which the resource allocation facility 908 and/or other elements of a cloud computing platform may be configured.

While not illustrated in FIG. 9, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method comprising:
    associating a specified response time for a software application with an expected execution speed of a specific part of the software application;
    based at least on the specified response time, configuring a cloud computing platform to allocate cloud resources of the cloud computing platform to the software application;
    during execution of the software application on the cloud resources:
        monitoring the execution to determine an actual execution speed of the specific part of the software application on the cloud computing platform;
        performing a comparison of the actual execution speed of the specific part of the software application to the expected execution speed of the specific part of the software application; and
        managing allocation of the cloud resources to the software application based at least on the comparison of the actual execution speed of the specific part of the software application to the expected execution speed of the specific part of the software application,
        the managing comprising, in at least one instance when the specified response time is not being met and the actual execution speed of the specific part of the software application falls below the expected execution speed of the specific part of the software application, not allocating additional cloud resources to the software application.

2. The method of claim 1, the cloud resources comprising virtual machines.

3. The method of claim 1, the managing further comprising:
    in another instance when the specified response time is not being met and the actual execution speed of the specific part does not fall below the expected execution speed of the specific part, allocating additional cloud resources to the software application.

4. The method of claim 3, wherein the specified response time identifies a specified time limit for servicing user requests.

5. The method of claim 4, further comprising:
    associating the specified response time with a specified percentage of the user requests to be serviced within the specified time limit,
    wherein managing allocation of the cloud resources is further based at least on whether the specified percentage of the user requests are serviced within the specified time limit.

6. The method of claim 5, wherein the comparison involves determining whether the actual execution speed of the specific part of the software application falls below the expected execution speed of the specific part of the software application by more than a threshold amount.

7. The method of claim 1, wherein the cloud resources comprise resource containers.

8. The method of claim 7, wherein the resource containers comprise processing resources and information storage resources.

9. A system comprising:
    cloud resources configured to provide virtual machines;
    a processor; and
    a computer-readable storage medium storing computer-executable instructions which, when executed by the processor, cause the processor to:
    access a specification that associates a specified response time for a software application to respond to received requests with an expected execution speed for a specific part of the software application;
    allocate a specified number of virtual machines to the software application;
    monitor execution of the software application while the software application is using the specified number of virtual machines to determine whether an actual execution speed of the specific part of the software application falls below the expected execution speed;
    when the software application fails to meet the specified response time and the actual execution speed of the specific part of the software application meets the expected execution speed, allocate at least one additional virtual machine to the software application; and
    when the software application fails to meet the specified response time and the actual execution speed of the specific part of the software application falls below the expected execution speed, allocate no additional virtual machines to the software application.

10. The system of claim 9, wherein the computer-executable instructions, when executed by the processor, cause the processor to:
    determine whether the actual execution speed of the specific part of the software application falls below the expected execution speed by more than a threshold amount.

11. The system of claim 9, wherein the computer-executable instructions, when executed by the processor, cause the processor to:

initially allocate a particular number of virtual machines to the specific part of the software application based at least on the expected execution speed for the specific part.

12. The system of claim 9, wherein the computer-executable instructions, when executed by the processor, cause the processor to:
store execution times of the software application in a log; and
monitor the execution of the software application by reviewing the log to determine the actual execution speed of the specific part of the software application.

13. The system of claim 12, wherein the computer-executable instructions, when executed by the processor, cause the processor to:
store, in the log, start and end times for individual executions of the software application.

14. A cloud computing platform comprising:
cloud resources configured to execute a software application;
a processor; and
a computer-readable storage medium storing computer-executable instructions which, when executed by the processor, cause the processor to:
access a specification that identifies a specified response time for the software application to respond to received requests when executing on the cloud resources;
based at least on the specified response time, allocate individual cloud resources of the cloud computing platform to the software application;
during the execution of the software application on the individual cloud resources, monitor the execution to determine whether an actual execution speed of a specific part of the software application is slower than an expected execution speed; and
manage allocation of the cloud resources to the software application based at least on whether the actual execution speed of the specific part of the software application is slower than the expected execution speed,
wherein, in a particular instance, the allocation of the cloud resources is managed by:
making a first determination that the specified response time is not being met;
making a second determination that the actual execution speed of the specific part of the software application falls below the expected execution speed by more than a threshold amount; and
based at least on the first determination and the second determination, not allocating additional cloud resources to the software application.

15. The cloud computing platform of claim 14, wherein, in another instance, the allocation of the cloud resources is managed by:
making a third determination that the specified response time is not being met;
making a fourth determination that the actual execution speed of the specific part of the software application is within the threshold amount of the expected execution speed of the specific part of the software application; and
based at least on the third determination and the fourth determination, allocating additional cloud resources to the software application.

16. The cloud computing platform of claim 15, wherein the additional cloud resources include a virtual machine.

17. The cloud computing platform of claim 15, the specific part of the software application comprising an application layer that performs logically-related functionality, the software application comprising at least one other part comprising another application layer that performs other logically-related functionality.

18. The cloud computing platform of claim 17, wherein the computer-executable instructions, when executed by the processor, cause the processor to:
allocate different numbers of cloud resources to the application layer and the another application layer based at least on different execution speeds of the application layer and the another application layer.

19. The cloud computing platform of claim 15, wherein making the second determination and the fourth determination comprises determining consistency with which the specific part of the software application falls below the expected execution speed over time.

20. The cloud computing platform of claim 14, wherein the computer-executable instructions, when executed by the processor, cause the processor to:
determine that at least one cloud resource can be deallocated from the software application while continuing to meet the specified response time; and
deallocate the at least one cloud resource from the software application.

* * * * *